(12) United States Patent
    Carstens et al.

(10) Patent No.: US 11,392,875 B2
(45) Date of Patent: Jul. 19, 2022

(54) RISK IDENTIFICATION ENGINE AND SUPPLY CHAIN GRAPH GENERATOR

(71) Applicant: Thomson Reuters Global Resources Unlimited Company, Baar (CH)

(72) Inventors: Lucas Carstens, London (GB); Jochen L. Leidner, London (GB); Krzysztof Szymanski, Gdansk (PL); Blake Howald, Northfield, MN (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 505 days.

(21) Appl. No.: 15/833,956

(22) Filed: Dec. 6, 2017

(65) Prior Publication Data

US 2018/0197128 A1    Jul. 12, 2018

Related U.S. Application Data

(60) Provisional application No. 62/430,633, filed on Dec. 6, 2016.

(51) Int. Cl.
    *G06Q 10/06*    (2012.01)
    *G06F 16/28*    (2019.01)
    (Continued)

(52) U.S. Cl.
    CPC ....... *G06Q 10/0635* (2013.01); *G06F 16/288* (2019.01); *G06F 16/9024* (2019.01); *G06F 40/205* (2020.01)

(58) Field of Classification Search
    None
    See application file for complete search history.

(56) References Cited

U.S. PATENT DOCUMENTS

2008/0281915 A1* 11/2008 Elad ................ G06Q 30/02
                                                    709/204
2013/0262331 A1* 10/2013 Fischer ............ G06Q 10/087
                                                    705/318
(Continued)

FOREIGN PATENT DOCUMENTS

EP        3249588 A1 * 11/2017    ........... G06Q 10/087
WO    WO-2017131745 A1 *  8/2017

OTHER PUBLICATIONS

Ben Mahmoud. A Risk Propagation Based Quantitative Assessment Methodology for Network Security—Aeronautical Network Case Study. 2011 Conference on Network and Information Systems Security. 2011 Conference on Network and Information Systems Security (pp. 1-9). (Year: 2011).*

(Continued)

*Primary Examiner* — Patricia H Munson
*Assistant Examiner* — Nancy N Prasad
(74) *Attorney, Agent, or Firm* — Duncan Galloway Greenwald PLLC; Kevin T. Duncan

(57) ABSTRACT

The present invention relates to a computer-based system for identifying supply chain risks and generating supply chain graphs representing an interconnected network of entities. An industrial graph database application is configured to account for direct and indirect (transitive) supplier risk and importance, based on a weighted set of measures: criticality, replaceability, centrality and distance. A graph-based model serves as an interactive and visual supply chain risk and importance explorer. A supply network is induced from textual data by applying text mining techniques to news stories and used to populate the supply chain/graph database.

22 Claims, 7 Drawing Sheets

(51) Int. Cl.
*G06F 16/901* (2019.01)
*G06F 40/205* (2020.01)

(56) References Cited

U.S. PATENT DOCUMENTS

| | | | | |
|---|---|---|---|---|
| 2014/0058775 | A1* | 2/2014 | Siig | G06Q 10/06 705/7.12 |
| 2015/0381649 | A1* | 12/2015 | Schultz | H04L 63/1433 726/25 |
| 2016/0048788 | A1* | 2/2016 | Martin | H04L 41/065 705/7.25 |

OTHER PUBLICATIONS

Gneiser et al., Nov. 23, 2010, Valuation of online social networks taking into account users' interconnectedness, Springer-Verlag. Inf Syst E-Bus Manage (2012) 10:61-84. (Year: 2010).*

Bruyckere, Valerie et al. Systemic risk rankings and network centrality in the European banking sector. European Central Bank. Eurosystem. No. 1848. Published: Sep. 2015. (Year: 2015).*

Bordera; Jose et al. Estimation of privacy risk through centrality metrics. Future Generation Computer Systems 82. Published: Dec. 2017. https://www.researchgate.net/publication/322089202_Estimation_of_privacy_risk_through_centrality_metrics (Year: 2017).*

\* cited by examiner

RISK IDENTIFICATION ENGINE AND SUPPLY CHAIN GRAPH GENERATOR

CROSS REFERENCE TO RELATED APPLICATION

The present application claims benefit of priority to provisional application, with Application No. 62/430,633 filed Dec. 6, 2016, entitled MODELING COMPANY RISK & IMPORTANCE IN SUPPLY GRAPHS, the entirety of which is hereby incorporated by reference.

FIELD OF THE INVENTION

This invention generally relates to the field of mining and intelligent processing of data collected from content sources. More specifically, this invention relates to systems for calculating scores for the importance and risk exposure of suppliers in a graph of interconnected companies (of suppliers and their consignees).

BACKGROUND OF THE INVENTION

Organizations operate in risky environments. Competitors may threaten their markets; regulations may threaten margins and business models; customer sentiment may shift and threaten demand; and suppliers may suffer equally from such threats and may go out of business and threaten supply. Three main areas of risk are operational, change and strategic. World events such as terrorism, natural disasters and the global financial crisis have raised the profile of negative risk while events such as the advent and widespread use of the Internet represent positive risks. Now more than ever, organizations must plan, respond and recognize all forms of risks that they face. Risk management is a central part of operations and strategy for any prudent organization and requires as a core business asset the ability to identify, understand and deal with risks effectively to increase success and reduce the likelihood of failure. Early detection and response to risks is a key need for any business and other entity.

A supply chain is a complex network of interconnected actors that continually exchange goods, with the goal of producing value for all actors in the supply chain. Though supply chains are growing ever more involved, and remain as vital as ever to companies' success, many companies operate with little insight beyond their first-tier suppliers and customers. This means that any disruption occurring removed from a company's immediate view risks to be met with little preparedness, and without mitigation strategies in place.

To alleviate such risks of being unprepared it is in the interest of companies to increase visibility in supply chains, identifying not only actors they directly interface and exchange goods with, but also those residing in subsequent tiers. In addition, much of the management of supply chains within companies are founded upon ad hoc methods, relying heavily on human expert knowledge and intuition.

Currently, various event alerts with respect to entities and activities are common. However, such alerts occur after the fact. While alerts as to the actual occurrence of an event which puts an entity or topic/concern at risk is important, the mining of potential risks is believed to be very useful in decision making with respect to management of an entity. One challenge facing users concerned with performing effective risk assessment and management is to compile not only sufficient information, but information of the proper type to better formulate a judgment as to what constitutes a risk. Without the ability to access and assimilate a variety of different information sources, and particularly from a sufficient number and type of information sources, the identification, assessment and communication of potential risks is significantly hampered. Currently, gathering of risk-related information is performed manually and lacks defined criteria and processes for mining meaningful risks to provide a clear picture of the risk landscape.

With the advents of the printing press, typeset, typewriting machines, computer-implemented word processing and mass data storage, the amount of information generated by mankind has risen dramatically and with an ever quickening pace. As a result of the growing and divergent sources of information, manual processing of documents and the content therein is no longer possible or desirable. Accordingly, there exists a growing need to collect and store, identify, track, classify and catalogue, and process this growing sea of information/content and to deliver value added service to facilitate informed use of the data and predictive patterns derived from such information. Due to the development and widespread deployment of and accessibility to high speed networks, e.g., Internet, there exists a growing need to adequately and efficiently process the growing volume of content available on such networks to assist in decision making. In particular, the need exists to quickly process information pertaining to corporate performance and events that may have an impact (positive or negative) on such performance so as to enable informed decision making in light of the effect of events and performance, including predicting the effect such events may have on operational risk management, the price of traded securities or other offerings. Events that potentially have an impact on company performance and/or viability include supply chain-related events.

In many areas and industries, including financial services sector, for example, there are content and enhanced experience providers, such as The Thomson Reuters Corporation, Wall Street Journal, Dow Jones News Service, Bloomberg, Financial News, Financial Times, News Corporation, Zawya, and New York Times. Such providers identify, collect, analyze and process key data for use in generating content, such as reports and articles, for consumption by professionals and others involved in the respective industries, e.g., Chief Risk Officers (CROs), procurement officers, financial consultants and investors. In one manner of content delivery, these financial news services provide financial news feeds, both in real-time and in archive, that include articles and other reports that address the occurrence of recent events that are of interest to investors. Many of these articles and reports, and of course the underlying events, may have a measureable impact on the trading stock price associated with publicly traded companies. Although often discussed herein in terms of publicly traded stocks (e.g., traded on markets such as the NASDAQ and New York Stock Exchange), the invention is not limited to stocks and includes application to other forms of investment and instruments for investment. Professionals and providers in the various sectors and industries continue to look for ways to enhance content, data and services provided to subscribers, clients and other customers and for ways to distinguish over the competition. Such providers strive to create and provide enhance tools, including search and ranking tools, to enable clients to more efficiently and effectively process information and make informed decisions. Information of interest to such providers and their customers include supply chain-related information.

Advances in technology, including database mining and management, search engines, linguistic recognition and modeling, provide increasingly sophisticated approaches to searching and processing vast amounts of data and documents, e.g., database of news articles, financial reports, blogs, tweets, updates, SEC and other required corporate disclosures that may affect supply chain risk and more generally business performance and, therefore, prices related to the stock, security or fund comprised of such equities. Investment and other financial professionals and other users increasingly rely on mathematical models and algorithms in making professional and business determinations. Especially in the area of investing, systems that provide faster access to and processing of (accurate) news and other information related to corporate performance will be a highly valued tool of the professional and will lead to more informed, and more successful, decision making. Information technology and, in particular, information extraction (IE) are areas experiencing significant growth to assist interested parties to harness the vast amounts of information accessible through pay-for-services or otherwise available such as via the Internet.

Many financial services providers use "news analysis" or "news analytics," which refer to a broad field encompassing and related to information retrieval, machine learning, statistical learning theory, network theory, and collaborative filtering, to provide enhanced services to subscribers and customers. News analytics includes the set of techniques, formulas, and statistics and related tools and metrics used to digest, summarize, classify and otherwise analyze sources of information, often public "news" information. An exemplary use of news analytics is a system that digests, i.e., reads and classifies, financial information to determine market impact related to such information while normalizing the data for other effects. News analysis refers to measuring and analyzing various qualitative and quantitative attributes of textual news stories, such as that appear in formal text-based articles and in less formal delivery such as blogs and other online vehicles. More particularly, the present invention concerns analysis in the context of electronic content. Expressing, or representing, news stories as "numbers" or other data points enables systems to transform traditional information expressions into more readily analyzable mathematical and statistical expressions and further into useful data structures and other work product. News analysis techniques and metrics may be used in the context of finance and more particularly in the context of investment performance—past and predictive.

Given the vast amount of news, legal, regulatory and other entity-related information based on text, content and context, investors and those involved in financial services have a persistent need and desire for an understanding of how such vast amounts of information, even processed information, relates to actionable intelligence to foresee, plan, mitigate resource loss, and insure against risk including the likely movement of a company's stock price.

One problem in risk management for supply chain risk (e.g., procurement), is that typically companies have limited knowledge of supply risk exposure and are typically only aware of their direct suppliers, or suppliers once removed, or a subset thereof. This presents a potentially high level of risk from an operational standpoint and in the case of publicly traded companies a risk to stock price for investors.

SUMMARY OF THE INVENTION

The present invention provides technical solutions for use in solving the afore-mentioned problems prevalent in the area of risk management. More specifically, the present invention provides a system for supply risk detection and analysis that includes and accounts for risk propagation along a chain of distribution and supply chain to identify and mitigate supply chain risk.

The present invention provides a system that calculates risk/importance scores across a graph of interconnected entities in a supply chain. The problem solved by such a 'holistic' method is that transitive relationships can thus be considered (e.g., two suppliers obtaining goods from the same indirect supplier lead to a lack of redundancy and lack of supply resilience in the network that the company at the receiving end may not be aware of—confluent relation). The invention provides a system for scoring supply risks. The scores taught can be used to inform of potential supply chain risk, e.g., rankings of possible suppliers in procurement so that the least risky suppliers are selected. Advantages of the present invention include: automatic operation; holistic solution (considers whole graph ecosystem, not just one vendor); highly interpretable (unlike some machine learning models it can be understood by humans); and trainable (weights can be learned from data as available).

Managing one's supply chain is a key task in the operational risk management for any business. Human procurement officers can manage only a limited number of key suppliers directly, yet global companies often have thousands of suppliers as part of a wider ecosystem, which makes overall risk exposure hard to track. To this end, we present an industrial graph database application to account for direct and indirect (transitive) supplier risk and importance, based on a weighted set of measures: criticality, replaceability, centrality and distance.

With our work we present a novel approach to investigating the structure of a company's supply chain, based on insights extracted from free text. We represent relations between companies as a graph, where companies are represented as nodes and supply relations as directed edges, pointing from a supplier to a customer (or consignee). Not only does this allow us to interpret relations between companies in a formally defined manner, but it additionally provides the opportunity to investigate links between companies beyond their first-tier suppliers and customers. More specifically, we use this graph to identify peers of a company within its supply chain that are not only particularly relevant, but that are also exposed to certain risks and thus increase the potential for supply chain disruptions. Our graph-based model captures the connectedness of the supplier-consignee supply chain ecosystem in conjunction with the strength of the relationships and the risk exposure of each company entity, which transitively affects potentially large parts of the graph. Specifically, we have developed a solution that is comprised of two APIs, which together provide an aggregate view of peers that are important suppliers to a company, while also being exposed to certain risks.

Peers of a company are extracted from a graph database. A pre-specified number of neighbors, from within a pre-specified distance from the node, are extracted and subsequently scored for their importance to the company and their risk. Such a graph model has the potential to serve as the basis for numerous subsequent experiments, including exploring the resilience.

Described in detail hereinbelow are implementations of exemplary graph-based models, including as an interactive and visual supply chain risk and importance explorer. Using a supply network (comprised of approximately 98,000 companies and 220,000 relations) induced from textual data by applying text mining techniques to news stories, we investigate whether our scores may function as a proxy for actual supplier importance, which is generally not known, as supply chain relationships are typically closely guarded trade secrets. To our knowledge, this is the largest-scale graph database and analysis on real supply relations reported to date.

The present invention also comprises a method to propagate company risks along a connected graph of supplier relationships and a graphical user interface to provide a user with visualizations related to identified risks.

Current systems and methods for risk identification typically involve human labor: analysts manually read news articles and populate spreadsheets, run Google searches and write down the results or use copy & paste. Additionally, keyword-based alerts may be used, but lead to information overflow of irrelevant documents (false positive problem), because a keyword search engine does not understand the content, and the keyword's context is ignored. This manual process is tedious, time-consuming, inefficient and results in delayed or abandoned efforts due to staleness of data. It is not possible to effectively collect, analyze and generate useful results in a timely manner using manual means.

The present invention may be incorporated into an Enterprise Content Platform (ECP) that combines risk mining and supply chain graph information in a single database. This will provide supply chain risk mined from textual sources, and may include the results of risk mining using an SVP. The present invention may also be used as a component for event extraction application for detecting supply chain disruptions (e.g. Floods, explosions). The present invention may also be used in risk mining to automatically identify risks relating to suppliers in a supply chain.

There are known services providing preprocessing of data, entity extraction, entity linking, indexing of data, and for indexing ontologies that may be used in delivery of peer identification services. For example U.S. Pat. No. 7,333,966, entitled SYSTEMS, METHODS, AND SOFTWARE FOR HYPERLINKING NAMES, U.S. Pat. Pub. 2009/0198678, entitled SYSTEMS, METHODS, AND SOFTWARE FOR ENTITY RELATIONSHIP RESOLUTION, U.S. patent application Ser. No. 12/553,013, entitled SYSTEMS, METHODS, AND SOFTWARE FOR QUESTION-BASED SENTIMENT ANALYSIS AND SUMMARIZATION, filed Sep. 2, 2009, U.S. Pat. Pub. 2009/0327115, entitled FINANCIAL EVENT AND RELATIONSHIP EXTRACTION, and U.S. Pat. Pub. 2009/0222395, entitled ENTITY, EVENT, AND RELATIONSHIP EXTRACTION, the contents of each of which are incorporated herein by reference herein in their entirety, describe systems, methods and software for the preprocessing of data, entity extraction, entity linking, indexing of data, and for indexing ontologies in addition to linguistic and other techniques for mining or extracting information from documents and sources.

Additionally, systems and methods exist for identifying entity peers including U.S. patent application Ser. No. 14/926,591, (Olof-Ors et al.) entitled DIGITAL COMMUNICATIONS INTERFACE AND GRAPHICAL USER INTERFACE, filed Oct. 29, 2015, which is hereby incorporated by reference in its entirety.

Additionally, systems and methods for identifying risks and developing risk profiles include U.S. patent application Ser. No. 13/423,127, entitled METHODS AND SYSTEMS FOR RISK MINING AND FOR GENERATING ENTITY RISK PROFILES, filed Mar. 16, 2012, published as U.S. 2012/0221485; U.S. patent application Ser. No. 13/423,134, entitled METHODS AND SYSTEMS FOR RISK MINING AND FOR GENERATING ENTITY RISK PROFILES AND FOR PREDICTING BEHAVIOR OF SECURITY, filed Mar. 16, 2012, published as U.S. 2012/0221486; and U.S. patent application Ser. No. 12/628,426, entitled METHOD AND APPARATUS FOR RISK MINING, filed Dec. 1, 2009, published as U.S. 2011/0131076, each of which are incorporated by reference herein in their entirety.

In a first embodiment the present invention provides a computer-based system for identifying supply chain risks and generating supply chain graphs representing an interconnected network of entities. The system comprises: a computing device having a processor in electrical communication with a memory, the memory adapted to store data and instructions for executing by the processor; a graph database using graph structures for semantic queries and accessible by the computing device and having stored therein a first data set comprising supply relations data, a set of nodes, and a set of edges; wherein each node represents a company and comprises a set of attributes related to the company, the set of attributes including two or more of: business sector, credit risk score, risk score, company name, and closeness centrality score; wherein each edge represents a directed supply relationship pointing from a supplier to a customer and directly relates items stored in the graph database; wherein the supply relations data is at least in part derived from a set of source data in electronic form and representing textual content comprising potential relation and risk phrases and/or numeric data; a risk scoring module adapted to access the first data set from the graph database, generate a set of scores related to the first data set, and store the set of scores in the graph database, wherein the risk scoring module generates the set of scores using both direct and transitive risk propagation along a plurality of nodes; and a supply graph generator adapted to access the first data set and the set of scores stored in the graph database and generate for presentation at a remote user computing device a directed graph comprising a plurality of interconnected nodes and edges representing a network of supply chain related entities.

The system may further comprise and be further characterized in one or more of the following manners: wherein the supply graph generator is adapted to generate for presentation at a remote user computing device at least one of: 1) a cyclic graph; and 2) a directed acyclic graph (DAG); wherein the graph database is adapted for use with one of Cypher Query Language or SPARQL query language; wherein the graph database is a Resource Description Framework (RDF) database and supply relations data is stored in a RDF triple format and is used to populate the graph database; further comprising a supply relations search and analytics engine adapted to automatically identify and extract supply relations data from the set of source data and to store the extracted supply relations data in the graph database, the extracted supply relations data comprising supplier/customer pairs, and wherein the supply relations search and analytics engine is adapted to automatically update the first data set on a continuing basis as additional supply relations data is extracted from additional source data; wherein the graph database is from the group consisting of: neo4j, Gephi, AllegroGraph, ArangoDB, Blazegraph, Cayley, DGraph, DataStax, SAP Hana, Oracle Spatial and Graph, OpenLink Virtuoso, Sparksee, Graphbase, gStore, InfiniteGraph, JanusGraph, MarkLogicSqrrl Enterprise, Teradata Aster, TigerGraph, Resource Description Framework (RDF) database, and Microsoft SQL Server; further comprising: an entity-risk relation classifier adapted to identify and extract entity-risk relations from the set of source data, the entity-risk relation classifier comprising: a risk tagger adapted to identify in the set of source data a set of risk candidates based on the set of risk types; and an entity tagger adapted to identify mentions of entity names in the set of source data; wherein the entity-risk relation classifier maps the identified set of risk types to the identified entity names; wherein the closeness centrality score C for each node is determined by using the following equation:

$$C(x)=(N-1)/\Sigma_y\, d(y, x)$$

wherein here a given node(x) represents company x and the closeness centrality score C(x) for company x represents a measure of node(x)' s centrality in a graph G as the sum of the length of the shortest paths between the node(x) and all other nodes in the graph, with N being the total node count and d(x,y) being the distance between nodes x and y; wherein for a given customer c having an associated $node_c$ and having an identified set of suppliers $s=\{s_0, \ldots s_n\}$ each having an associated node, the risk scoring module is further adapted to generate a set of risk scores $R=\{r_0, \ldots r_n\}$ and a set of importance scores $I=\{i_0, \ldots i_n\}$; wherein each risk score $r_m \in R$ is based on a single attribute of a node in the graph G, the single attribute representing a credit risk associated with supplier m; wherein each importance score $i_m \in I$ is an aggregate of a plurality of measures including at least two of the following measures: criticality; replaceability; centrality; and distance; wherein criticality is a function of a proportion of goods, materials, commodities or other things received in business sector q associated with target company c as supplied from suppliers $s=\{s_0, \ldots s_n\}$ operating in identified business sector associated with such suppliers s; wherein replaceability is a function of the sum of the number of suppliers $s \in S$ that operate in the same business sector as $s_m$; wherein centrality is a closeness centrality score represents the importance $i_m$ of supplier $s_m$ as a function of the associated node's centrality in a graph G as the sum of the length of the shortest paths between the $node(s_m)$ and all other nodes in the graph; and wherein distance is a function of a distance between the node associated with each supplier $s_m$ and the node associated with company c; wherein the importance score $i_m \in I$ for a given supplier $s_m$ is an aggregate of criticality (a), replaceability (b), centrality (c), and distance (d) measures associated with that supplier as represented in the following equation:

$$i_m = \left(\frac{a+b+c+d}{4}\right)/\max \in I.$$

The system may further comprise and be further characterized in one or more of the following manners: further comprising a supply relations search and analytics engine adapted to automatically identify and extract supply relations data from the set of source data and to store the extracted supply relations data in the graph database, and wherein the supply relations search and analytics engine comprises a machine learning module and is further adapted to automatically identify and extract supply relations data based on the following model: a) identify company names appearing in a document; b) parse documents into word sentences; c) identify and select candidate word sentences that contain two company names and a predefined relation-indicating pattern; and d) label company names appearing in the candidate word sentences as one of supplier, customer or neither; wherein the relation-indicating pattern is based on a set of indicative n-grams and variations of the indicative n-grams associated with relation-indicating words; and wherein the set of source data received comprises one or more of: an indexed search; a news archive; a news feed; structured data sets; unstructured data sets; social media content; regulatory filings Bills of lading; Customs forms/data; Procurement data bases; and Enterprise Resource Planning (ERP) systems.

In a second embodiment the present invention provides a computer-implemented method for identifying supply chain risks and generating supply chain graphs representing an interconnected network of entities. The method being implemented by a special purpose computing device having a processor in electrical communication with a memory. The method comprising: storing by the memory data and instructions for executing by the processor; accessing by the computing device a graph database and using graph structures for semantic queries and accessing a first data set comprising supply relations data, a set of nodes, and a set of edges stored in the graph database; wherein each node represents a company and comprises a set of attributes related to the company, the set of attributes including two or more of: business sector, credit risk score, risk score, company name, and closeness centrality score; wherein each edge represents a directed supply relationship pointing from a supplier to a customer and directly relates items stored in the graph database; wherein the supply relations data is at least in part derived from a set of source data in electronic form and representing textual content comprising potential relation and risk phrases and/or numeric data; accessing by a risk scoring module executed by the processor the first data set from the graph database, and generating a set of scores related to the first data set, and storing the set of scores in the graph database, and generating by the risk scoring module the set of scores using both direct and transitive risk propagation along a plurality of nodes; and accessing by a supply graph generator the first data set and the set of scores stored in the graph database and generating for presentation at a remote user computing device a directed graph comprising a plurality of interconnected nodes and edges representing a network of supply chain related entities.

The method may further comprise and be further characterized in one or more of the following manners: generating by the supply graph generator for presentation at a remote user computing device at least one of: 1) a cyclic graph; and 2) a directed acyclic graph (DAG); wherein the graph database is adapted for use with one of Cypher Query Language or SPARQL query language; wherein the graph database is a Resource Description Framework (RDF) database and supply relations data is stored in a RDF triple format and is used to populate the graph database; providing a supply relations search and analytics engine adapted to automatically identify and extract supply relations data from the set of source data and to store the extracted supply relations data in the graph database, the extracted supply relations data comprising supplier/customer pairs, and wherein the supply relations search and analytics engine is adapted to automatically update the first data set on a continuing basis as additional supply relations data is extracted from additional source data; wherein the graph database is from the group consisting of: neo4j, Gephi, AllegroGraph, ArangoDB, Blazegraph, Cayley, DGraph, DataStax, SAP Hana, Oracle Spatial and Graph, OpenLink Virtuoso, Sparksee, Graphbase, gStore, InfiniteGraph, JanusGraph, MarkLogicSqrrl Enterprise, Teradata Aster, TigerGraph, Resource Description Framework (RDF) database, and Microsoft SQL Server; further comprising: providing an entity-risk relation classifier adapted to identify and extract entity-risk relations from the set of source data, the entity-risk relation classifier comprising: a risk tagger adapted to identify in the set of source data a set of risk candidates based on the set of risk types; and an entity tagger adapted to identify mentions of entity names in the set of source data; wherein the entity-risk relation classifier maps the identified set of risk types to the identified entity names; wherein the closeness centrality score C for each node is determined by using the following equation:

$$C(x) = (N-1)/\Sigma_y d(y, x)$$

wherein here a given node(x) represents company x and the closeness centrality score C(x) for company x represents a measure of node(x)'s centrality in a graph G as the sum of the length of the shortest paths between the node(x) and all other nodes in the graph, with N being the total node count and d(x,y) being the distance between nodes x and y; wherein for a given customer c having an associated node$_c$ and having an identified set of suppliers s={$s_0, \ldots s_n$} each having an associated node, the risk scoring module is further adapted to generate a set of risk scores R={$r_0, \ldots r_n$} and a set of importance scores I={$i_0, \ldots i_n$}; wherein each risk score $r_m \in R$ is based on a single attribute of a node in the graph G, the single attribute representing a credit risk associated with supplier m; wherein each importance score $i_m \in I$ is an aggregate of a plurality of measures including at least two of the following measures: criticality; replaceability; centrality; and distance; wherein criticality is a function of a proportion of goods, materials, commodities or other things received in business sector q associated with target company c as supplied from suppliers s={$s_0, \ldots s_n$} operating in identified business sector associated with such suppliers s; wherein replaceability is a function of the sum of the number of suppliers s∈ S that operate in the same business sector as $s_m$; wherein centrality is a closeness centrality score represents the importance $i_m$ of supplier $s_m$ as a function of the associated node's centrality in a graph G as the sum of the length of the shortest paths between the node($s_m$) and all other nodes in the graph; and wherein distance is a function of a distance between the node associated with each supplier $s_m$ and the node associated with company c; wherein the importance score $i_m \in I$ for a given supplier $s_m$ is an aggregate of criticality (a), replaceability (b), centrality (c), and distance (d) measures associated with that supplier as represented in the following equation:

$$i_m = \left(\frac{a+b+c+d}{4}\right) / \max \in I.$$

The method may further comprise and be further characterized in one or more of the following manners: further comprising providing a supply relations search and analytics engine adapted to automatically identify and extract supply relations data from the set of source data and to store the extracted supply relations data in the graph database, and wherein the supply relations search and analytics engine comprises a machine learning module and is further adapted to automatically identify and extract supply relations data based on the following model: a) identify company names appearing in a document; b) parse documents into word sentences; c) identify and select candidate word sentences that contain two company names and a predefined relation-indicating pattern; and d) label company names appearing in the candidate word sentences as one of supplier, customer or neither; wherein the relation-indicating pattern is based on a set of indicative n-grams and variations of the indicative n-grams associated with relation-indicating words; and wherein the set of source data received comprises one or more of: an indexed search; a news archive; a news feed; structured data sets; unstructured data sets; social media content; regulatory filings Bills of lading; Customs forms/data; Procurement data bases; and Enterprise Resource Planning (ERP) systems.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

Figure 1:
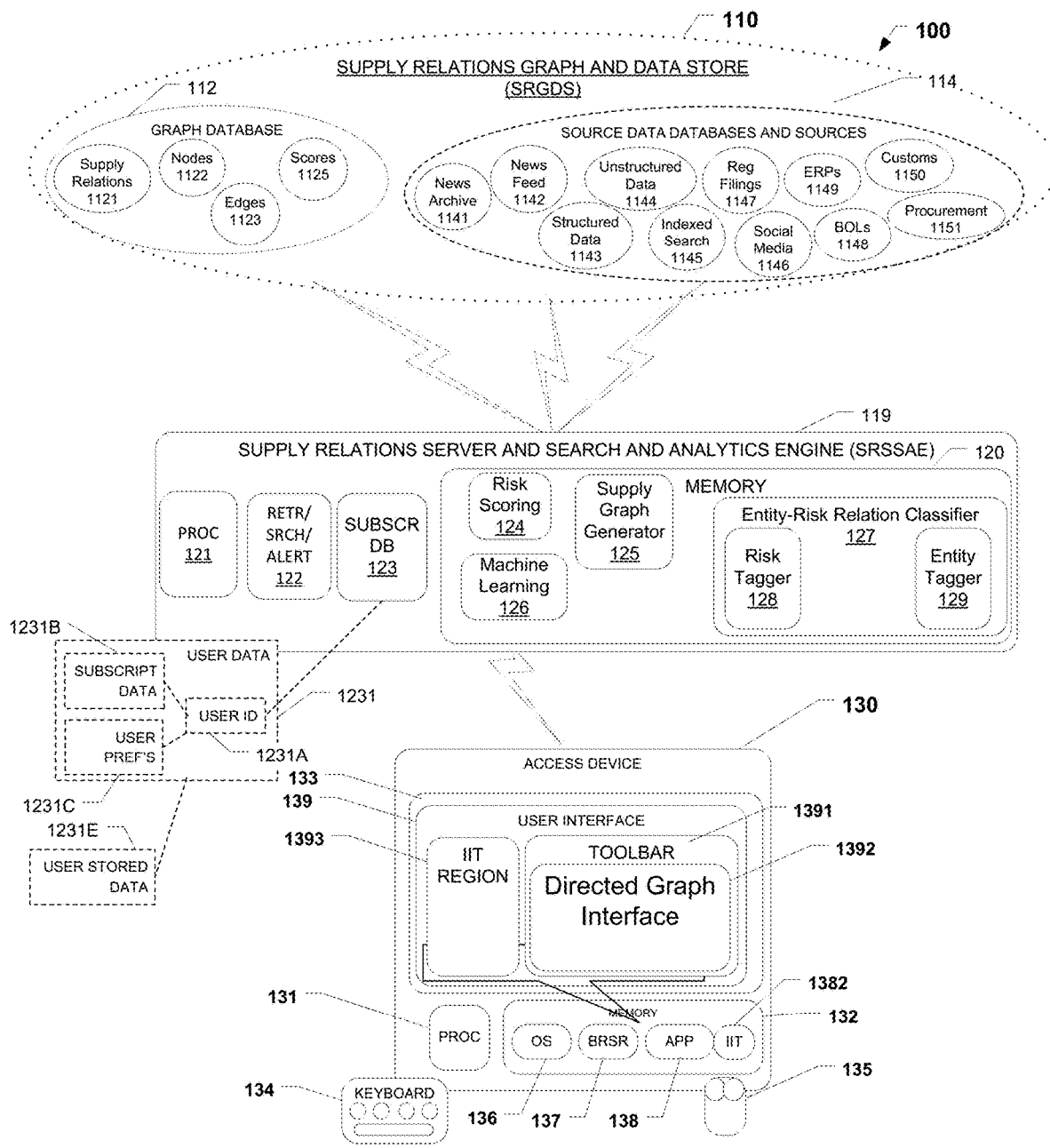
FIG. 1 is a schematic diagram illustrating a system for identifying supply chain risks and generating supply chain graphs representing an interconnected network of entities in accordance with a first embodiment of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

A risk is a potential future event or situation that has implications, including implications that affect one or more entities directly or indirectly related to the event or situation. Although risk may be impliedly negative, i.e., the possibility of something bad happening in the future, it may conversely have a positive implication, i.e., the possibility of something good happening. To distinguish between positive and negative risks and, respectively, good and bad events, an alternative approach may be used. For example, in configuring a system risks may be used for negative events and another term, e.g., opportunities, may be used in reference to the potential for good events. As used herein for purposes of describing and claiming the invention, unless stated otherwise, the term risk should be given the broad meaning of encompassing both or either possibilities of good and bad events, e.g., for quantifying risk a negative (−) may be associated with a score or quantification of negative (bad) risk and a positive (+) may be associated with a positive (good) risk. An overall risk may be the summation of negative and positive risks. A bad or good event is when something that once was just a risk—whether it was recognized before or not—has materialized, i.e. it has actually happened. According to this terminology, a risk already incorporates a potential modality, and therefore it makes no sense to speak of a potential risk, as that is already implied in the risk term. Events can unfold, i.e., they can change their spatiotemporal scope, which may include other, dependent risks materializing in the process.

Doing business involves the business entity being exposed to a variety of risks, and also involves and requires recognizing, avoiding, mitigating, or insuring against these risks as an integral part of running a successful business. In the area of supply chain management or supply chain risk identification and quantification there are suppliers S (or vendors) that sell goods to companies, e.g., customers C, that combine input from multiple parties, process/recombine the input and sell the processed/recombined input as output to other companies, who may also be considered suppliers themselves. Whether an entity is a supplier or customer depends on perspective and relative position in a transaction or chain of distribution. This creates a large, world-wide network of dependencies. In a world of global trade and interconnectivity where specialization levels are reaching unprecedented levels, risks connected to the supply chain are an important source of potential problems that need to be monitored.

For example, a supplier of special drilling equipment to oil companies could be affected by talent attrition risk. The talent attrition risk may have the effect of placing the company's existence at risk. If the drilling equipment is solely available from a single supplier, this fact should be red-flagged and the oil company should be made aware as early as possible to take appropriate action (e.g., sourcing from a backup supplier, building their own in-house backup method/work-around, insuring).

Likewise, if a car seat manufacturer is sourcing a particular part from a supplier whose factory was destroyed unexpectedly by an earthquake, the manufacturer may break contract regarding delivering its car seats to its customer, large car companies. Yet, despite the importance of supply chain risk, there are no systematic tools that can systematically identify and alert the situations outlined above.

Risk permeates all aspects of doing business. However, to date, support tools for helping to systematically identify the whole spectrum of risks that a company is exposed to are lacking. The system of the present invention addresses these problems and is able to construct lists of risks a company faces, to be used in a qualitative assessment of risk. Existing risk management systems fail to incorporate a system or method for systematic, repeatable risk identification. The computer-supported risk identification process of the present invention comprises a more holistic risk management approach that leads to more consistent (i.e., objective, repeatable) risk analysis.

All activities of business are exposed to a broad diversity of risks: a company's business partners can engage in a lawsuit, a supplier can fail to deliver the volume or quality of the goods expected, the company location's environment can become prone to natural disasters like earthquakes, volcanoes, or human-made disasters like political instability. Additionally, the market appetite for a company's products may change, or technology disruptions may make the products superfluous altogether. Finally, the business can mismanage its customer relationships or its finances and go bankrupt.

Pursuing any kind of business activity is inseparably interwoven with being exposed to different kinds of risk. In this description we focus on supply chain risk but one possessing ordinary skill in the art would appreciate that other forms of risk may be included to supplement the supply chain risk formulations discussed herein.

Our work spans a number of fields, touching upon risk and graph analysis, as well as the more nascent area of scientific supply chain analysis, all of which we base on content extracted from a variety of sources including Internet-based data/information sources. Little research has considered the application of both risk and graph analysis to supply chains and modeling. The work of Wagner and Neshat (Wagner, S. M., and Neshat, N. Assessing the vulnerability of supply chains using graph theory. *International Journal of Production Economics* 126, 1 (2010), 121-129), investigate supply chain risk quantification and mitigation based on graph theory, presents a notable exception. Work that resides at the intersection of at least two areas includes: Aggarwal (Aggarwal, C. C. An introduction to social network data analytics. In *Social netwwork data analytics*. Springer, 2011, pp. 1-15), for an overview of graph analysis; Bisias, et al. (Bisias, D., Flood, M. D., Lo, A. W., and Valavanis, S. A survey of systemic risk analytics. *US Department of Treasury, Office of Financial Research*, 0001 (2012)) for research on risk; and Tayur et al. (Tayur, S., Ganeshan, R., and Magazine, M. *Quantitative models for supply chain management*, vol. 17. Springer, 2012) for a summary of recent advances in supply chain management and procurement.

Supply Graphs—Recent trends in the analysis of supply chains have highlighted the value of representing supply chains as graphs, or networks, rather than as flat structures and relational databases. Related to this effort, Borgatti et al. (Borgatti, S. P., and Li, X. On social network analysis in a supply chain context. *Journal of Supply Chain Management* 45, 2 (2009), 5-22) provide an overview of social network analysis, geared towards supply chain research. In the same vein, Kim and colleagues (Kim, Y., Choi, T. Y., Yan, T., and Dooley, K. Structural investigation of supply networks: A social network analysis approach. *Journal of Operations Management* 29, 3 (2011), 194-211) interpret supply chains as networks and apply social network analysis metrics, such as closeness or betweenness centrality, to evaluate the flow of materials through a supply chains, as well as contractual relationships. Interpreting supply chains as graphs produces wholly new opportunities to investigate structural characteristics and transitive links of complex relations.

In addition, Tan et al. (Tan, K. H., Zhan, Y., Ji, G., Ye, F., and Chang, C. Harvesting big data to enhance supply chain innovation capabilities: An analytic infrastructure based on deduction graph. *International Journal of Production Economics* 165 (2015), 223-233) propose the use graphs to identify innovation potential throughout a network of interlinked companies. Further exploiting graph capabilities, Xu et al. (Xu, N.-R., Liu, J.-B., Li, D.-X., and Wang, J. Research on evolutionary mechanism of agile supply chain network via complex network theory. *Mathematical Problems in Engineering* 2016 (2016)) describe a mechanism that dynamically grows and alters supply networks, reflecting the dynamic nature of supply relations.

Risk & Importance in Supply Chains. Much of the development in assessing risk in supply chains is based on qualitative studies, using expert opinion and case studies. For example, Blome et al. (Blome, C., and Schoenherr, T. Supply chain risk management in financial crises—a multiple case-study approach. *International Journal of Production Economics* 134,1 (2011), 43-57) investigate whether the 2008 financial crisis has had an impact on how risk is managed and, more specifically, whether any of the stages of risk analysis, risk mitigation and risk monitoring have changed. Similarly, Hallikas et al. (Hallikas, J., Karvonen, I., Pulkkinen, U., Virolainen, V.-M., and Tuominen, M. Risk management processes in supplier networks. *International Journal of Production Economics* 90, 1 (2004), 47-58) conduct case studies on eleven companies, operating in either the electronics or metal industry, to illustrate challenges that network co-operation brings to risk management. Aqlan et al. (Aqlan, F., and Lam, S. S. A fuzzy-based integrated framework for supply chain risk assessment. International *Journal of Production Economics* 161 (2015), 54-63) describe a risk assessment framework that produces risk scores for suppliers, customers, manufacturers, transportation and commodities. For each stakeholder, experts are consulted to identify the main risk factors. This produces a quantification related to joining impact potential with the risk of this impact actually materializing. Ghadge et al. (Ghadge, A., Dani, S., Chester, M., and Kalawsky, R. A systems approach for modelling supply chain risks. *Supply Chain Management: An International Journal* 18, 5 (2013), 523-538) describe a framework comprised of an iterative process to identify, assess and mitigate supply chain risks. They focus on risk assessment, which is comprised of risk modeling and sensitivity analysis, using both a risk register and data collected through interviews, company reports, etc. Harland et al. (Harland, C., Brenchley, R., and Walker, H. Risk in supply networks. *Journal of Purchasing and Supply Management* 9, 2 (2003), 51-62) describe a network risk tool to address the same challenges. The authors focus on risks arising from product and service complexity, out sourcing, globalization and e-business. Based on a set of surveys and focus groups, Jüttner (Jüttner, U. Supply chain risk management: Understanding the business requirements from a practitioner perspective. *The International Journal of Logistics Management* 16, 1 (2005), 120-141) seeks to identify and understand business requirements for SCRM from the perspective of professionals working in the field.

To structure overarching issues encountered in her analysis into these levels, Jüttner first identifies the extent to which organizations already manage risks in their supply chain and then determines critical issues that arise as part of the implementation of risk management. Simchi-Levi, Schmidt and Wei (Simchi-Levi, D., Schmidt, W., and Wei, Y. From superstorms to factory fires: Managing unpredictable supply chain disruptions. *Harvard Business Review* 92,1 (2014), 96-100) present a dynamic graph model, which includes recovery time. Unlike our model, their data is obtained from human questionnaires, not automatic text mining.

Risk & Importance in Graphs—The use of attack graphs represents one approach to interpreting risk and adverse events in graphs. Attack graphs, as well as attack trees are used to model all possible attacks, or exploits, on a network. In an early proposal for the application of attack-graphs to the identification of risks in physical networks Phillips and Swiler (Phillips, C. A., and Swiler, L. P. A graph-based system for network-vulnerability analysis. *In Proceedings of the* 1998 *Workshop on New Security Paradigms, Charlottsville, Va., USA, Sep. 22-25,* 1998 (1998), pp. 71-79) coin network-vulnerability analysis. In a more recent development, Alhomidi and Reed (Alhomidi, M., and Reed, M. Attack graph-based risk assessment and optimization approach. *International Journal of Network Security & Its Applications* 6, 3 (2014), 31) use a genetic algorithm (GA) (Mitchell, M. An introduction to genetic algorithms. MIT Press, 1998) to model a large number of possible paths in attack graphs, where each path connects the source of an attack on a network to the target of the attack. In each path, nodes are assigned with a probability that represents the likelihood of the node being exploited by an attacker, as well as an expected loss, accrued when a node is indeed attacked. In an adoption of attack graphs, Poolsappasit et al. (Poolsappasit, N., Dewri, R., and Ray, I. Dynamic security risk management using Bayesian attack graphs. *IEEE Trans. Dependable Sec. Comp.* 9, 1 (2012), 61-74) propose a framework for dynamically managing security risks called Bayesian attack graphs (BAG). The overall risk of each possible path in an attack graph is calculated as a product of the attack success likelihoods and the value of the expected loss incurred. Based on data for 371 banks that failed during the 2008 financial crisis, Huang et al. (Huang, X., Vodenska, I., Havlin, S., and Stanley, H. E. Cascading failures in bipartite graphs: model for systemic risk propagation. *Scientific Reports* 3 (2013)) study the systemic risk of financial systems. To do so they propose a cascading failure model to describe the risk propagation process during crises. A bipartite banking network model is proposed, where one type of node represents banks and another represents assets held by banks.

The resulting graph is shocked by decreasing the total market value of an asset, leading to a decrease in value for every bank that holds the affected asset. Stergiopoulos et al. (Stergiopoulos, G., Kotzanikolaou, P., Theocharidou, M., and Gritzalis, D. Risk mitigation strategies for critical infrastructures based on graph centrality analysis. *International Journal of Critical Infrastructure Protection* 10 (2015), 34-44) extend the notion of cascading failure models to include graph centrality measures to help identify the nodes most critical in identifying and mitigating failures. Graph centrality here is used as a proxy for identifying the most important nodes within a graph so that any risk mitigation strategy may be based on both the importance of nodes and their susceptibility to failure, in general. None of the work surveyed above provides a larger-scale supply chain graph model, which can be used for the analysis of and experimentation with supply relation scoring methods.

The following describes an effective process and system that can be used for the analysis of and experimentation with supply relation scoring methods and model, as well as exemplary implementations.

Building a Supply Graph—To build a supply graph we start with developing a graph database with source data and configured to generate risk-based supply graphs. The analysis of supply relations between companies is based on a graph database, where the nodes represent companies and edges signify directed supply relations, e.g., pointing from a supplier to a customer. Supplier/customer pairs are extracted automatically from data, such as and including news articles. Each node in the graph is assigned a set of attributes, namely (i) related business sector, (ii) risk score, e.g., credit risk score, (iii) the company name and (iv) a closeness centrality score. We describe the data extraction process, as well as the node attributes, in detail below, for two separate, exemplary supply graphs. On the one hand we conduct experiments, as described below, on the full graph (SPR+), with all its attributes. On the other hand, necessitated by the proprietary nature of this data, we make available a second dataset (SPR≠) for research purposes (see http://bit.ly/TRSupplyChainRisk); in it, company names and business sectors are anonymized. Table 1 below summarizes the main characteristics of the data.

TABLE 1

Dataset: Summary Statistics.

| | |
|---|---|
| Number of nodes | 98,402 |
| Number of vertices | 217,188 |
| Average path length | 6.614 |
| Average Degree | 4.414 |
| Average closeness centrality | 0.225 |

Supply Relations Data—In this example, both datasets, SPR+ and SPR≠, are comprised of supply relations between two companies, where each individual relation and the companies involved are automatically extracted form text snippets. While we describe a static snapshot of the dataset, an underlying RDF triple store of supply relations is continually updated, both to add new relations and to remove those considered out of date. A snippet corresponds to a sentence, extracted either from a news article or a Security and Exchange Commission (SEC) filing. In testing efficacy, a logistic regression model was trained on a set of 45,000 snippets, while the test set was comprised of 20,000 snippets. The training and test data were aggregated using the following procedure:

1. identify companies in a document, using Calais (available at www.opencalais.com);
2. split documents into sentences;
3. choose candidate sentences that contain two companies, as well as one or more of a pre-specified set of patterns; and
4. using means, e.g., Mechanical Turk, to label companies in the candidate sentences as suppliers, customers, or neither.

Patterns are based on a set of indicative n-grams, as well as variations of these n-grams to catch terms such as "powered by", "contracts with", and other such indicative terms. Each candidate sentence was labeled, e.g., by two separate Turkers, and any disagreement was addressed by presenting the instance to a third annotator. The regression model has been tuned to yield high precision, focusing on the extraction of high quality evidence sentences, while relying on the fact that eventually, highly indicative sentences will be introduced into the dataset. The classifier produced an F1-score F1=0.57 (with precision=0.76 and recall=0.46) on the test set. Data is stored in an RDF triple store from which we can extract a subset or, to populate our graph database, the entire set using Sparql queries. Sparql Protocol and RDF Query Language, a semantic query language for databases, is able to retrieve and manipulate data stored in Resource Description Framework (RDF) format. This triple store is continually updated to add additional relations found in unseen text; multiple patterns producing the same supplier-consignee pairs are aggregated to a single triple. Each triple has a confidence score assigned, based on the classifier output as well as the number of examples found for a specific relation.

Company Attributes—To score a company according to its "importance" as a supplier to a customer, as well as the risk it is exposed to, we assign a set of attributes to each company, in addition to its name for identification purposes. In one exemplary manner the "importance" of a company is determined based on how a supplier's attributes compares to those of the customer, as well as both their position in the overall graph.

Business Sector—Each company in the supply graph is labeled with the business sector it operates in. For purposes of example but not limitation, in this example we use the Thomson Reuters Business Classification (TRBC) (available at http://financial.thomsonreuters.com/en/products/data-analytics/market-data/indices/trbc-indices.html) scheme for this purpose, a widely used industry standard. The TRBC scheme offers classification of companies at various levels of abstraction, i.e. economic sectors, the most abstract level, business sectors, industry groups, industries, and activities. To strike a compromise between informativeness and the ability to group various companies we label companies with their business sector, meaning that we distinguish between, in this example, 28 different labels, such as Renewable Energy, Industrial goods, etc.

Risk/Credit Risk—To identify and/or quantify the risk companies are exposed to, we score them according to a risk measure, for example a credit risk measure. For example, this score may broadly signify the likelihood of a company defaulting on one or more of their debt obligations within a year. In this example, a score between zero and 100 is used to signify the likelihood and in this example a lower score represents a higher likelihood of default.

Closeness Centrality—One goal of importance scoring is to incorporate both attributes of individual companies and those formalizing a company's role within a larger graph of companies. To this end we have chosen to score each node in the graph according to its closeness centrality. Closeness centrality measures a node's centrality in a graph as the sum of the length of the shortest paths between the node and all other nodes in the graph. This sum is usually normalized by division with the total node count N (minus one so as not to count the node itself) to represent the average length of the shortest paths, or distance d(y, x), giving the following equation:

$$C(x) = (N-1)/\Sigma_y d(y, x) \qquad (1)$$

wherein here a given node(x) represents company x and the closeness centrality score C(x) for company x represents a measure of node(x)'s centrality in a graph G as the sum of the length of the shortest paths between the node(x) and all other nodes in the graph, with N being the total node count and d(x,y) being the distance between nodes x and y.

Database—The data described above is initially extracted from the store, e.g., RDF store, and represented as separate node and edge tables, which are, in turn, used to populate a graph database, e.g., implemented using Neo4j. While the original dataset described here may contain proprietary data and not be published, anonymized versions of the node and edge tables may be made broadly available. To interact with the database, a graph query language may be used, e.g., Cypher, a graph query language developed as part of Neo4j. For example, to load the node table the system may call the following command:

---

1 USING PERIODIC COMMIT
2 LOAD CSV WITH HEADERS FROM 'file:///file_path/nodes.csv' as line
3 WITH line MERGE (ID:permID {name: TOINT(line.permID)})
4 SET ID.trbc = line.TRBC, ID.centrality = line.centrality,
5 ID.company_name = line.company_name,
6 ID.ccgr = line.CCGR;

and, to load the edge table, for example, the system may call the following command:

```
1 USING PERIODIC COMMIT
2 LOAD CSV WITH HEADERS FROM 'file:///file_path/rels.csv' as line_b
3 MATCH (sup:permID {name: TOINT(line_b.supplier)})
4 WITH sup, line_b MATCH (cus:permID {name: TOINT(line_b.customer)})
5 MERGE (sup)-[:supplies]->(cus)
```

This process populates a previously initialized Neo4j instance, which can then be queried. In this exemplary case we want to evaluate the importance and risk of a pre-defined number of suppliers, as well as suppliers of suppliers and so on, to a specific customer. To do so, we need to identify a single node within the database, i.e., node associated with the specific customer, and query for neighbors whose directionality points towards that node, i.e., the specific company's suppliers. Depending on the setting of the query we may do this recursively to not only retrieve direct suppliers, but suppliers of suppliers, also. We generally refer to direct suppliers as first-tier suppliers, to suppliers of suppliers as second-tier suppliers, and so forth. By way of example, the following command may be used to retrieve up to 1,000 first-tier and second-tier suppliers of the node 0123456789:

```
1 MATCH (n:permID {name: 0123456789}),
2 p=shortestPath((x)-[:supplies*1..2]->(n))
3 WITH LENGTH(p) AS lp, x LIMIT 1001
4 RETURN
5 x.name, x.trbc, x.ccgr, x.centrality, x.company_name, lp;.
```

Note in this example we set the limit to 1,001 because the node we are searching for is included in the limit, as well. While we have used Neo4j as the database of choice we opted to run graph analyses using Gephi (https://gephi.org). On the one hand we have used Gephi to calculate closeness centrality scores for nodes in the graph, as described above. On the other hand, Gephi provided a natural interface to run initial analyses on the graph to determine its overall structure. This includes calculating the measures reported in Table 1 above.

World Input-Output database (WIOD)—The World Input-Output Database (WIOD) (Timmer, M. P., Dietzenbacher, E., Los, B., Stehrer, R., and Vries, G. J. An illustrated user guide to the world input-output database: the case of global automotive production. *Review of International Economics* 23, 3 (2015), 575-605) provides data on the distribution of supply activities between business sectors (available at http.//www.wiod.org/home). In this example, this data was used as part of the importance calculation, where we compare the business sector the supplier operates in with the business sector the customer resides in. The WIOD allows us to deduce whether these two industries have a strong relation, in terms of relative volume exchanged between the business sectors, compared to other business sector combinations. The WIOD is comprised of supply data between a total of 43 countries and compares business sectors based on the International Standard Industrial Classification (ISIC). Data is collected for the period between 2000 and 2014. Because in this exemplary embodiment we assigned TRBC codes to the companies that comprise the supply graph, we use a mapping between TRBC and ISIC codes that has been created internally to align the WIOD with our data.

Scoring Method—The graph database described above facilitates the analysis of supply relations between companies within the context of a larger network. We now describe how we use the graph database to identify relevant suppliers of a customer through multiple tiers of the supply graph and score them according to two metrics, (1) importance and (2) risk. Importance, described in detail immediately below, scores suppliers of a company based on a combination of metrics, incorporating both the structure of the graph and the supplier's position in it, and attributes of the supplier itself. With it we aim to quantify the adverse impact that a disruption to the supply, e.g., of key components or materials, from a specific supplier would have on a specific customer. In this example, a high importance, e.g., a score close to 1, reflects a high potential adverse impact. Risk, described further below, is scored, for example, according the credit risk scores assigned to each company in the graph.

Scoring Supply Chain Importance—In this exemplary embodiment, for purposes of providing helpful description and not by way of limitation, we calculate importance scores $I=(i_0, \ldots, i_n)$ for suppliers $S=(s_0, \ldots, s_n)$, each represented by a node in a graph, retrieved from the graph database. The nodes are retrieved in relation to node c, representing a customer, representing the n companies closest to c. Each importance score $i_m$ is an aggregate of four measures:

Criticality (a): The proportion of goods the business sector of q receives from the business sector of $i_m$ (based on WIOD data, see Section 3.4);

$$a = \text{Criticality}/m; \quad (2)$$

where m is a normalization constant m=34.27. The constant represents the strongest tie between any two industries in the WIOD dataset.

Replaceability (b): Represents a function of suppliers in the same business sector as $s_m$, e.g., the sum of how many suppliers s operate in the same business sector ($s \in S$) as $s_m$ (based on TRBC codes):

$$b = 1 - (\text{Replaceability}/(n-1)). \quad (3)$$

Centrality (c): Represents a metric of the importance of supplier $s_m$ to the overall graph. In this example, we use closeness centrality, discussed above. In this example, the closeness centrality score C for each node is determined by using equation (1) above and below:

$$C(x) = (N-1)/\Sigma\_y \, d(y,x);$$

wherein here a given node(x) represents company x and the closeness centrality score C(x) for company x represents a measure of node(x)'s centrality in a graph G as the sum of the length of the shortest paths between the node(x) and all other nodes in the graph, with N being the total node count and d(x,y) being the distance between nodes x and y. Centrality is represented as:

$$c = \text{Centrality} \quad (4)$$

Distance (d): Represents the (step-)distance between supplier $s_m$ and company of interest c.

$$d = (n - \text{Distance})/(n-1) \quad (5)$$

In this exemplary embodiment of determining I importance, we then calculate the importance score $i_m \in I$ for a given supplier $s_m$ as an aggregate of criticality (a), replaceability (b), centrality (c), and distance (d) measures associated with that supplier as represented in the following equation:

$$i_m = \left(\frac{a+b+c+d}{4}\right) / \max \in I \quad (6)$$

The above operations normalize all individual scores to a value in the range [0; 1]. The scores are also normalized so that a value closer to one reflects a higher importance. We also normalize $i_m$ by dividing its result by the maximum score of all i, so that the most important node always has a score of one and all other nodes are scored in relation to it. We catch the fringe case that yields division by zero programmatically (where n=1), in which case we can simply set $i_0 \leftarrow 1$.

Scoring Supply Chain Risk—The second metric according to which we score the suppliers is risk, in this example, credit risk. In a manner similar to importance I we calculate risk scores $R=(r_0, \ldots, r_n)$ for suppliers $S=(s_0, \ldots, s_n)$ of company or customer c. Each risk score $r_m$ is based on a single attribute of a node, namely one of two scores, (1) Credit Combined Global Rank or (2) Private Company SmartRatios Global Rank. Score (1) is assigned to public companies, while score (2) is used for private companies. Both scores may be extracted from proprietary Thomson Reuters solutions. The coverage of risk scores for companies that comprise the supply chain agreement dataset is roughly 26%. To cover the gaps, we heuristically determined risk scores for companies without a risk score. In a first step we grouped companies based on their business sector, using TRBC codes, and calculated the average risk for each business sector, using the available scores. Companies with missing risk scores were then assigned the average risk score according to their TRBC code. Once each node in the graph had a risk score assigned we normalized the score so that its range is between zero and one, and a higher score represents a higher risk.

System Description—The implementation of our scoring methodology is comprised of two components. On the one hand we have implemented two APIs to expose scoring algorithms, one each to execute the importance and risk scoring for the suppliers retrieved form the graph database and returning the results as json files. On the other hand, we set up a profile for an existing interface to dynamically visualize the results.

Application Programming Interfaces—The scoring algorithms described in the previous section are accessed through separate Application Programming Interfaces (APIs), each of which accept as arguments the following three parameters; company ID, node count and depth count. In the original dataset we use permIDs (available at https://permid.org/) as company IDs, which have been replaced by random ten-digit IDs in the public dataset.

The node count determines how many neighbors of the node representing the company ID are retrieved from the graph, while the depth count determines from how many tiers we retrieve neighbors. The system accepts two API calls, one to score supply chain importance and another to score risk. Each of the two APIs returns a json file with the following format:

```
 1 {
 2 "dimensionName": "Supply chain importance",
 3 "peers":[
 4 {
 5 "eid": "0022446688",
 6 "name": "c",
 7 "score": 1,
 8 "baseEntity": true
 9 },{
10 "eid": "8800224466",
11 "name": "s0",
12 "score": i0,
13 "baseEntity": false
14 },{
15 "eid": "6688002244",
16 "name": "s1",
17 "score": i1,
18 "baseEntity": false
19 },...{
20 "eid": "4466880022",
21 "name": "sn",
22 "score": in,
23 "baseEntity": false
24 }]
25 }
```

The output JSON file is comprised of the header and two types of blocks. The header identifies which dimension the scores in the JSON file represent. In the example this is the importance score. The first block following the header represents the input entity, i.e., the customer passed to the API. The baseEntity label is set to true to represent this and the score is set to a placeholder value of one. Each subsequent block represents a supplier of the baseEntity, which may be a supplier at any tier, depending on the parameter settings. Each block is comprised of the ID (eid), uniquely identifying the company, the company's name, its importance score and the baseEntity flag set to false. The output of the risk scoring API produces the same structure, the only difference being the dimension name in the header.

One exemplary implementation is illustrated and described with reference to FIG. 1, wherein the present invention is shown as a Supply Relations Risk Modeling System (SRRM or "SRRM system") 100 comprising a Supply Relations Graph and Data Store (SRGDS or "SRGD store" or SRGD database") 110 and Supply Relations Server and Search and Analytics Engine (SRSSAE or "SRSSA engine") 119. SRGD store 110 may be in any suitable form to deliver and receive data to/from SRSSA engine 119 and in the example shown includes graph database 112 and Source Data Databases and Sources 114, which is represented as a news/media and other content analytics system for information extraction system adapted to automatically process and "read" news stories and content from news, governmental filings, blogs, and other credible media sources, represented. SRSSA 119 is in electrical communication with SRGD Store 110, e.g., over one or more or a combination of Internet, Ethernet, fiber optic or other suitable communication means. SRSSA engine 119 provides a server having a processor module 121, a memory module 122, which comprises a subscriber database 123 comprised of user data 1231 which may include user ID data 1231A, subscription data 1231B, and user preference data 1231C and may also include additional user stored data 1231E. SRSSA engine includes Memory 120 having stored therein for execution by processor module 121 one or more supply relations search and analytics modules which may include one or more of Risk Scoring module 124, Supply Graph Generator 125, and machine learning module 126. In addition, a Risk Relation Classifier 127 may be included having a Risk Tagger module 128, and an Entity Tagger 129. One or more functions shown in SRSSA may be included in SRGD store 110 and may be executed as a pre-risk processing function. Processor module 121 includes one or more local or distributed processors, controllers, or virtual machines. Memory module 122, which takes the exemplary form of one or more electronic, magnetic, or optical data-storage devices, stores machine readable and/or executable instruction sets for wholly or partly defining software and related user interfaces for execution of the processor 121 of the various data and modules 124-129.

Quantitative and qualitative analysis, techniques or mathematics, such as Risk Scoring module 124 and Supply Graph generation module 125 may include predictive behavior determination capabilities, in conjunction with computer science methods discussed hereinbelow, are processed by processor 121 of SRSSA server 119 to arrive at Supply Chain Graphs, e.g., graphs may be cyclic or acyclic directed graphs. The SRRMS 100 automatically accesses and/or processes risk-related data sources including one or more of proprietary risk data streams, news stories, filings, and other content and may apply one or more computational linguistic techniques and resulting risk taxonomy against such content. The SRRM 100 may include functionality to identify entities, entity relationships, and supply chain risks and associate risks with particular entities and score the identified risks to generate a supply chain risk graph for communicating over a network to one or more connected remote access devices 130 operated by authorized users. The SRRM system 100 leverages traditional and new media resources to provide a risk-based solution using enhanced supply chain risk graphs and expands the scope of conventional tools to provide an enhanced analysis data structure for use by financial analysts, investment managers, risk managers and others interested in determining an awareness of supply chain risks.

The SRRM 100 may receive source data from a variety of supply chain risk data sources 114, including one or more of news media archive 1141, news feed(s) 1142, structured data 1143, unstructured data 1144, indexed search data 1145, social media 1146, governmental or regulatory filings source 1147, BOLs 1148, and/or Enterprise Resource Planning or Management data 1149, and customs data 1150 and procurement (e.g., internal Customer Resource Manager or Enterprise Resource data). SRGD store 110 may include or receive content from the following exemplary content sources: news/financial website services (e.g., TR News, TR Feeds, reuters.com, Thomson Financial, etc.); websites of governmental/regulatory agencies (e.g., epa.gov); third-party syndicated news (e.g., Newsroom). The invention may optionally employ other technologies, such as translators, character recognition, and voice recognition, to convert content received in one form into another form for processing by the SRGD store 110. In this manner, the system may expand the scope of available content sources for use in identifying entities, supply relationships and scoring supply chain risks.

In one example of how the SRRM may be further extended to process additional information, upon identifying in content obtained via TR News 1121 or TR Feeds 1122, e.g., legal reporter (e.g., Westlaw), that a company "Newco" has successfully enforced a patent ("XYZ" patent), the RRG may be updated to include as a positive risk "patent success." This risk represents the potential for future successful efforts in further enforcing the patent against other competitors or in accounting for potential future royalties and revenues or increased margins. In presenting this risk to users, the "patent success" risk may include a link to the content from which the risk was derived. For example, a supplier S1 of customer C1 may be sued for patent infringement and may be subject to injunction that could result in the supplier's inability to supply vital components to customer C1 and thus put in jeopardy C1's ability to produce products. This may have a ripple effect particularly is supplier S1 is C1's sole supplier or a key component. In this manner, a patent litigation order or decision may result in a change in the risk scoring associated with both entities S1 and C1 and others and result in a change in how the supply relationship is shown on a supply chain graph accessed by a user.

In addition, the SRRM 100 may include an entity-risk relation classification module 127 adapted to generate a classification system of entity/supply risks that serves as a classification system for use in risk-based investing. For example, companies presently assigned an RIC (Reuters Instrument Code), a ticker-like code used to identify financial instruments and indices, may be classified as "risk compliant" (e.g., achieved/maintained a supply risk score or profile of a certain level and/or duration). In this manner the invention may be used to create a class of supply risk-RICs for trading purposes. For example, a "Supply Risk Index" may be generated and maintained comprised, for instance, of companies that have attained a supply risk certification or supply risk-RIC or the like.

In one embodiment the SRGD 119 may include a training or machine learning module 126, such as Thomson Reuters' Machine Learning Capabilities and News Analytics, to derive insight from a broad corpus of risk related data, news, and other content, and may be used on providing a normalized risk score at the company (e.g., IBM) and index level (e.g., S&P 500). This historical database or corpus may be separate from or derived from supply data sources 114.

In one manner, the supply data source 114 may comprise continuous feeds and may be updated, e.g., in near or close to real time (e.g., about 150 ms), allowing the SRRM 100 to automatically analyze content, update data based on "new" content in close to real-time, i.e., within approximately one second.

The SRRM 100, powered by linguistics computational technology to process news/media data and content delivered to it, analyzes company-related news/media mentions to generate up-to-date risk registers. The quantitative and qualitative risk components provided by the SRRM 100 may be used in market making, in portfolio management to improve asset allocation decisions by benchmarking portfolio risk exposure, in fundamental analysis to forecast stock, sector, and market outlooks, and in risk management to better understand abnormal risks to portfolios and to develop potential risk hedges.

Content may be received as an input to the SRRM 100 in any of a variety of ways and forms and the invention is not dependent on the nature of the input. Depending on the source of the information, the SRRM 100 will apply various techniques to collect information relevant to the generation of the risk registers. For instance, if the source is an internal source or otherwise in a format recognized by the SRRM 100, then it may identify content related to a particular company or sector or index based on identifying field or marker in the document or in metadata associated with the document. If the source is external or otherwise not in a format readily understood by the SRRM, it may employ natural language processing and other linguistics technology to identify companies in the text and to which statements relate.

The SRRM 100 may be implemented in a variety of deployments and architectures. SRRM data can be delivered as a deployed solution at a customer or client site, e.g., within the context of an enterprise structure, via a web-based hosting solution(s) or central server, or through a dedicated service, e.g., index feeds.

FIG. 1 shows one embodiment of the SRRM 100 as a Supply Relations Risk Modeling System comprising an online information-retrieval system adapted to integrate with either or both of a central service provider system or a client-operated processing system, e.g., one or more access or client devices 130. In this exemplary embodiment, SRRM 100 includes at least one web server that can automatically control one or more aspects of an application on a client access device, which may run an application augmented with an add-on framework that integrates into a graphical user interface or browser control to facilitate interfacing with one or more web-based applications.

Subscriber database 123 includes subscriber-related data for controlling, administering, and managing pay-as-you-go or subscription-based access of databases 110. In the exemplary embodiment, subscriber database 123 includes one or more user preference (or more generally user) data structures 1231, including user identification data 1231A, user subscription data 1231B, and user preferences 1231C and may further include user stored data 1231E. In the exemplary embodiment, one or more aspects of the user data structure relate to user customization of various search and interface options. For example, user ID 1231A may include user login and screen name information associated with a user having a subscription to the supply chain risk scoring service distributed via SRRM 100.

Access device 130, such as a client device, may take the form of a personal computer, workstation, personal digital assistant, mobile telephone, or any other device capable of providing an effective user interface with a server or database. Specifically, access device 130 includes a processor module 131 including one or more processors (or processing circuits), a memory 132, a display, a keyboard 134, and a graphical pointer or selector 135. Processor module 131 includes one or more processors, processing circuits, or controllers. Memory 132 stores code (machine-readable or executable instructions) for an operating system 136, a browser 137, and applications module 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. Upon launching processing software an integrated information-retrieval graphical-user interface 139 is defined in memory 132 and rendered on display 133. Upon rendering, interface 139 presents data in association with one or more interactive control features.

In one manner of operation, SRRM 100 provides a computer-based system for identifying supply chain risks and generating supply chain graphs representing an interconnected network of companies or entities including those in a supply/customer relationship. The SRRM 100 as shown in FIG. 1, comprises a server/computing device, Supply Relations Server and Search and Analytics Engine (SRSSA) 119, having a processor 121 in electrical communication with a memory 120. The memory 120 is adapted to store data and instructions for executing by the processor 121. The server/computing device 119 is in electrical communication with the Supply Relations Graph and Data Store (SRGDS) 110 and in particular in communication with the graph database 112. This communication may be either through local connection or over a communications network (one or a combination of wired, wireless, Internet, Ethernet, optical, or other suitable means of communication).

The graph database 112 uses graph structures for semantic queries and is accessible by the computing device 119. The graph database 112 has stored therein a first data set comprising supply relations data, a set of nodes, and a set of edges, wherein each node represents a company and comprises a set of attributes related to a given company. The set of attributes may include two or more of: business sector, credit risk score, risk score, company name, and closeness centrality score. In one exemplary manner, the closeness centrality score C for each node may be determined by using the following equation:

$$C(x) = (N-1)/\Sigma_y d(y, x)$$

wherein here a given node(x) represents company x and the closeness centrality score C(x) for company x represents a measure of node(x)'s centrality in a graph G as the sum of the length of the shortest paths between the node(x) and all other nodes in the graph, with N being the total node count and d(x,y) being the distance between nodes x and y.

Each edge may represent a directed supply relationship pointing from a first company, e.g., supplier, to a second company, e.g., customer, and directly relates items stored in the graph database 112. The supply relations data is at least in part derived from a set of source data in electronic form and at least in one manner represents textual content comprising potential relation and risk phrases and/or numeric data. The risk scoring module 124 is adapted to access supply relations data from the graph database 112, generate a set of scores related to the supply relations data, and store the set of scores in the graph database. In one exemplary manner, the risk scoring module 124 generates the set of scores using both direct and transitive risk propagation along a plurality of nodes. The supply graph generator 125 is adapted to access the supply relations data and the set of scores stored in the graph database 112 and generate for presentation at a remote user computing device, e.g., user operating remote access device 130 having a display 133, a directed graph, e.g., via Directed Graph Interface 1392, comprising a plurality of interconnected nodes and edges representing a network of supply chain related entities.

The SRRM system 100 may further comprise and be further characterized in one or more of the following manners. The supply graph generator 125 may be adapted to generate for presentation at the remote user computing device 130 at least one of: 1) a cyclic graph; and 2) a directed acyclic graph (DAG). The graph database 112 may be adapted for use with one of Cypher Query Language or SPARQL query language, and may be a Resource Description Framework (RDF) database with supply relations data stored in a RDF triple format and for use in populating the graph database. Also, the SRSSAE may be adapted to automatically identify and extract supply relations data from the set of source data and store the extracted supply relations data in the graph database 112 and may be further adapted to automatically update the supply relations data on a continuing basis as additional supply relations data is extracted from additional source data. The extracted supply relations data may comprise supplier/customer pairs. The graph database 112 may be in the form of any of the following types: neo4j, Gephi, AllegroGraph, ArangoDB, Blazegraph, Cayley, DGraph, DataStax, SAP Hana, Oracle Spatial and Graph, OpenLink Virtuoso, Sparksee, Graphbase, gStore, InfiniteGraph, JanusGraph, MarkLogicSqrrl Enterprise, Teradata Aster, TigerGraph, Resource Description Framework (RDF) database, and Microsoft SQL Server.

SRSSAE may further comprise an entity-risk relation classifier 127 adapted to identify and extract entity-risk relations from the set of source data. The entity-risk relation classifier 127 may comprise a risk tagger 128 adapted to identify in the set of source data a set of risk candidates based on the set of risk types, and an entity tagger 129 adapted to identify mentions of entity names in the set of source data. In addition, the entity-risk relation classifier 127 may map the identified set of risk types to the identified entity names.

For a given customer c having an associated $node_c$ and having an identified set of suppliers $s=\{s_0, \ldots s_n\}$ each having an associated node, the risk scoring module 124 may be further adapted to generate a set of risk scores $R=\{r_0, \ldots r_n\}$ and a set of importance scores $I=\{i_0, \ldots, i_n\}$. Each risk score $r_m \in R$ may be based on a single attribute of a node in the graph G, the single attribute representing, for example, a credit risk associated with supplier m. Each importance score $i_m \in I$ may be an aggregate of a plurality of measures including, for example, at least two of the following measures: criticality; replaceability; centrality; and distance. Criticality may be a function of a proportion of goods, materials, commodities or other things received in business sector q associated with target company c as supplied from suppliers $s=\{s_0, \ldots s_n\}$ operating in identified business sector associated with such suppliers s. Replaceability may be a function of the sum of the number of suppliers $s \in S$ that operate in the same business sector as $s_m$. Centrality may be a closeness centrality score representing the importance $i_m$ of supplier $s_m$ as a function of the associated node's centrality in a graph G as the sum of the length of the shortest paths between the node($s_m$) and all other nodes in the graph. Distance may be a function of a distance between the node associated with each supplier $s_m$ and the node associated with company c. In this manner, for example, the importance score $i_m \in I$ for a given supplier $s_m$ is an aggregate of criticality (a), replaceability (b), centrality (c), and distance (d) measures associated with that supplier as represented in the following equation:

$$i_m = \left(\frac{a+b+c+d}{4}\right) / \max \in I.$$

The SRGD Store 110 may be further configured to automatically identify and extract supply relations data from the set of source data and to store the extracted supply relations data in the graph database 112. The SRSSA may further comprise a machine learning module 126 and be further adapted to automatically identify and extract supply relations data based on the following model: a) identify company names appearing in a document; b) parse documents into word sentences; c) identify and select candidate word sentences that contain two company names and a predefined relation-indicating pattern; and d) label company names appearing in the candidate word sentences as one of supplier, customer or neither; wherein the relation-indicating pattern is based on a set of indicative n-grams and variations of the indicative n-grams associated with relation-indicating words. The set of source data received may comprise one or more of: an indexed search; a news archive; a news feed; structured data sets; unstructured data sets; social media content; regulatory filings Bills of lading; Customs forms/data; Procurement data bases; and Enterprise Resource Planning (ERP) systems.

Figure 2:
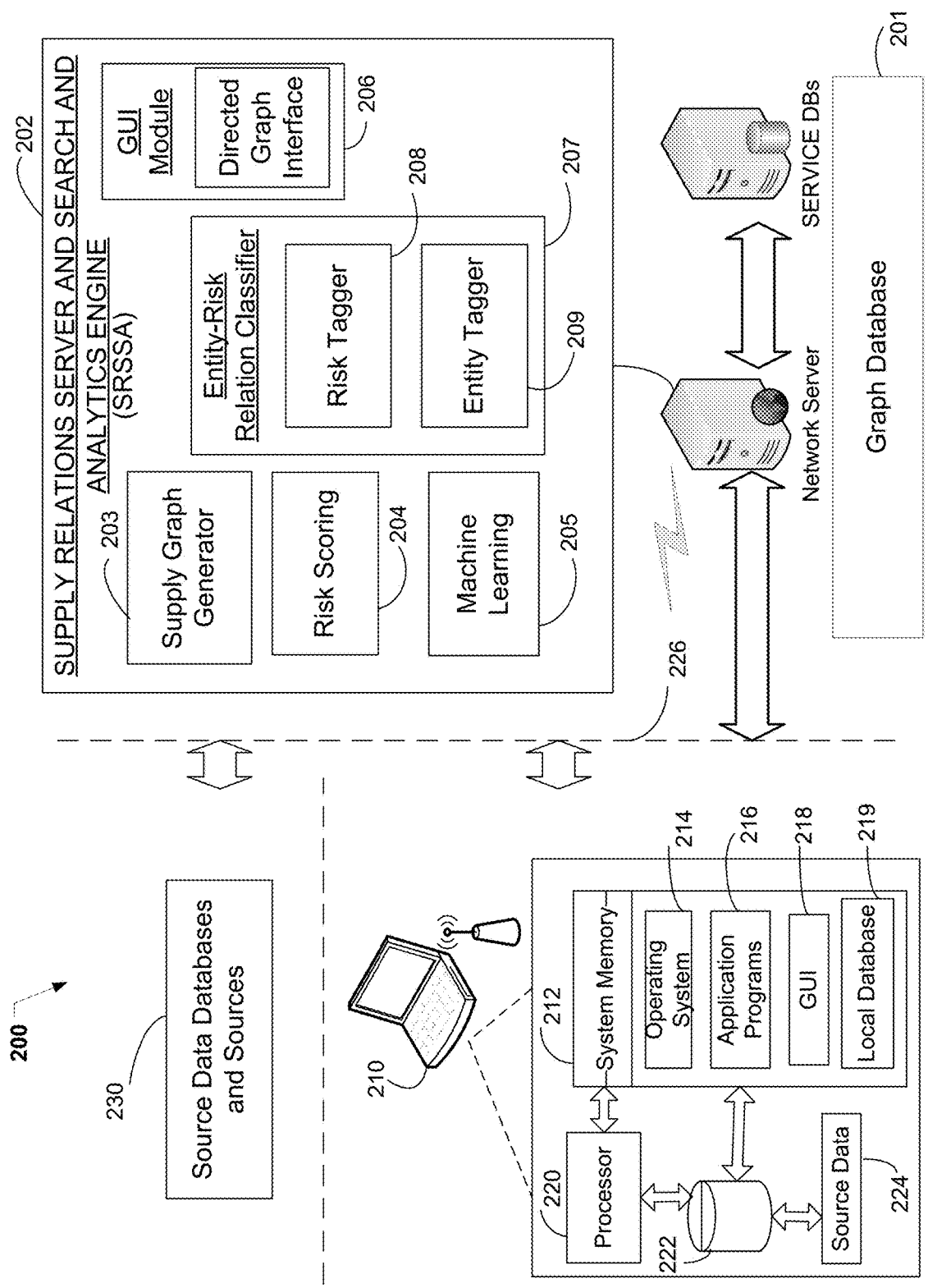
FIG. 2 is a schematic diagram illustrating a second embodiment of the present invention.

Now with reference to FIG. 2, an alternative configuration of SRRM 100 is shown as SRRM system 200 again as a Supply Relations Risk Modeling System comprising an online information-retrieval system adapted to communicate with internal Servers and Databases, including Graph Database 201, external Source Data Databases 230, and client-operated devices 210. In this exemplary embodiment, SRRM 200 comprises a Supply Relations Server and Search and Analytics Engine (SRSSA) 202 comprised of a supply graph generator 203, risk scoring module 204, machine learning module 205, GUI module and Directed Graph Interface 206, and optionally an entity-risk relation classifier 207 comprised of a risk tagger 208 and an entity tagger 209. A graph database 201 is accessible by the SRSSA 202 and uses graph structures for semantic queries. The graph database 112 has stored therein a first data set comprising supply relations data, a set of nodes, and a set of edges, wherein each node represents a company and comprises a set of attributes related to a given company. As described above, the set of attributes may include two or more of: business sector, credit risk score, risk score, company name, and closeness centrality score. Each edge may represent a directed supply relationship pointing from a first company, e.g., supplier, to a second company, e.g., customer, and directly relates items stored in the graph database 201. The risk scoring module 204 accesses supply relations data from the graph database 201, generate a set of scores related to the supply relations data by using both direct and transitive risk propagation along a plurality of nodes. The supply graph generator 205 accesses the supply relations data and the set of scores stored in the graph database 201 and generates for presentation at a remote user computing device 210 a directed graph, e.g., via Directed Graph Interface 206, comprising a plurality of interconnected nodes and edges representing a network of supply chain related entities.

Remote user device 210 may be any of a number of processor-based device adapted to run programming interfaces and present for two-way communication user interfaces. Specifically, access device 210 includes a processor 220, a system memory 212, a display, a keyboard, and a user input interface. Processor accesses instructions and data for execution from Memory 212, e.g., stored code (machine-readable or executable instructions), an operating system 214, an applications API module 216, and a GUI module 218.

Figure 3:
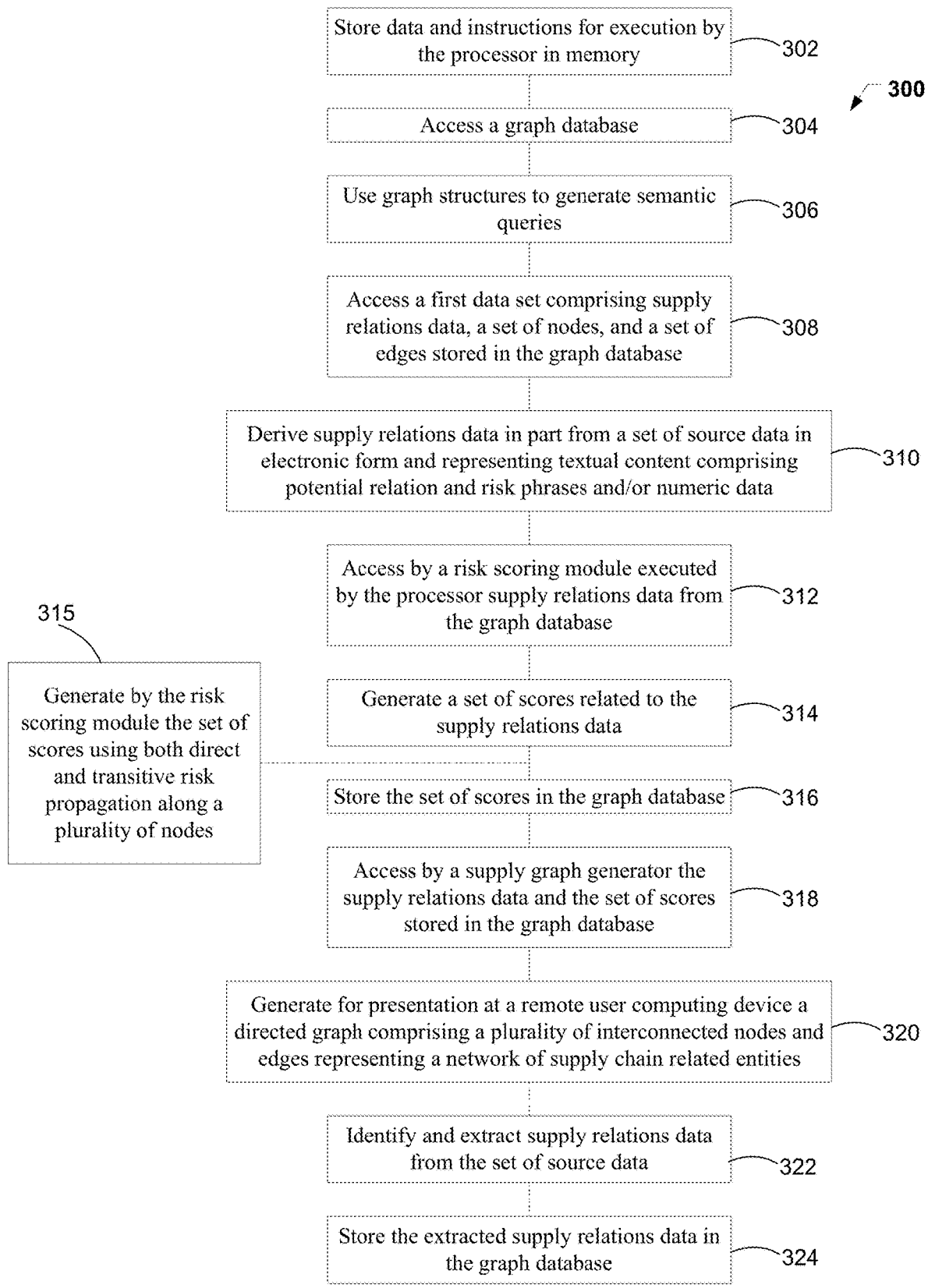
FIG. 3 is a flowchart of a process associated with the present invention.

Now with reference to FIG. 3, a Supply Chain Risk Identification and Scoring Process, represented as a flowchart 300, provides a process for identifying entities, entity relationships, supply relationships, and supply risks. In one manner, generally an entity-risk relation may involve identifying a first entity from a set of documents including supply chain data, identifying a second entity from the set of documents, identifying a risk associated with the second entity, and determining if the risk associated with the second entity affects the first entity.

More particularly, as shown in FIG. 3, a process 300 for identifying supply chain risks and generating supply chain graphs representing an interconnected network of entities is shown as provided by a computer-based system. The system comprises a computing device having a processor in electrical communication with a memory. The memory is adapted to store data and instructions for executing by the processor in accordance with step 302. At step 304 the processor accesses a graph database. The graph database is adapted to use graph structures for semantic queries at step 306 and access a first data set comprising supply relations data, a set of nodes, and a set of edges at step 308. In this example, each node represents a company and comprises a set of attributes related to the company and the set of attributes includes two or more of: business sector, credit risk score, risk score, company name, and closeness centrality score. In this example, each edge represents a directed supply relationship pointing from a supplier to a customer and directly relates items stored in the graph database. Also, at step 310, the supply relations data is at least in part derived from a set of source data in electronic form and, for example, representing textual content comprising potential relation and risk phrases and/or numeric data. A risk scoring module accesses supply relations data from the graph database at step 312, generates a set of scores related to the supply relations data at step 314, and stores the set of scores in the graph database at step 316. As shown in this example at step 315, the risk scoring module generates the set of scores using both direct and transitive risk propagation along a plurality of nodes. At step 318, a supply graph generator accesses the supply relations data and the set of scores stored in the graph database. At step 320 the supply graph generator generates for presentation at a remote user computing device a directed graph comprising a plurality of interconnected nodes and edges representing a network of supply chain related entities.

The data acquisition and the construction of the graph database is preferably decoupled from the supply risk scoring and graph generation processes. As such scoring may be executed on an existing dataset or an engine may, on the fly, produce the dataset. As shown in process 300, the additional and optional/decoupled steps 322 and 324 are shown. At step 322, the system identifies and extracts supply relations data from the set of source data. At step 324, the system stores the extracted supply relations data in the graph database, for example, for later recall.

In addition to the steps shown in process 300 of FIG. 3, the process may include additional functions performed by the SRRM system 100. For example, the process may include any one or more of the following functions. The supply graph generator may generate for presentation at a remote user computing device at least one of: 1) a cyclic graph; and 2) a directed acyclic graph (DAG). The graph database may use one of Cypher Query Language or SPARQL query language and, if a Resource Description Framework (RDF) database, may and store supply relations data in a RDF triple format to populate the graph database.

In addition, the SRRM system 100 may include an entity-risk relation classifier configured to identify and extract entity-risk relations from the set of source data. A risk tagger may be used to identify in the set of source data a set of risk candidates based on the set of risk types and an entity tagger may be used to identify mentions of entity names in the set of source data. In addition, the entity-risk relation classifier may map the identified set of risk types to the identified entity names.

Also, a closeness centrality score C for each node may be determined by using the following equation:

$$C(x) = (N-1)/\Sigma_y d(y,x)$$

wherein here a given node(x) represents company x and the closeness centrality score C(x) for company x represents a measure of node(x)'s centrality in a graph G as the sum of the length of the shortest paths between the node(x) and all other nodes in the graph, with N being the total node count and d(x,y) being the distance between nodes x and y.

In addition, the process 300 of FIG. 3 may be further configured to perform the following steps. For a given customer c having an associated $node_c$ and having an identified set of suppliers $s=\{s_0, \ldots s_n\}$ each having an associated node, generating, by the risk scoring module, a set of risk scores $R=\{r_0, \ldots r_n\}$ and a set of importance scores $I=\{i_0, \ldots i_n\}$. In addition, each risk score $r_m \in R$ may be generated based on a single attribute of a node in the graph G, the single attribute representing a credit risk associated with supplier m. Each importance score $i_m \in I$ may be generated as an aggregate of a plurality of measures including at least two of the following measures: criticality; replaceability; centrality; and distance. Criticality may be determined as a function of a proportion of goods, materials, commodities or other things received in business sector q associated with target company c as supplied from suppliers $s=\{s_0, \ldots s_n\}$ operating in identified business sector associated with such suppliers s. Replaceability may be determined as a function of the sum of the number of suppliers $s \in S$ that operate in the same business sector as $s_m$. Further, centrality may be determined as a closeness centrality score representing the importance $i_m$ of supplier $s_m$ as a function of the associated node's centrality in a graph G as the sum of the length of the shortest paths between the $node(s_m)$ and all other nodes in the graph. Further, distance may be determined a function of a distance between the node associated with each supplier $s_m$ and the node associated with company c. Further, the importance score $i_m \in I$ for a given supplier $s_m$ may be determined as an aggregate of criticality (a), replaceability (b), centrality (c), and distance (d) measures associated with that supplier as represented in the following equation:

$$i_m = \left(\frac{a+b+c+d}{4}\right) / \max \in I.$$

Figure 4:
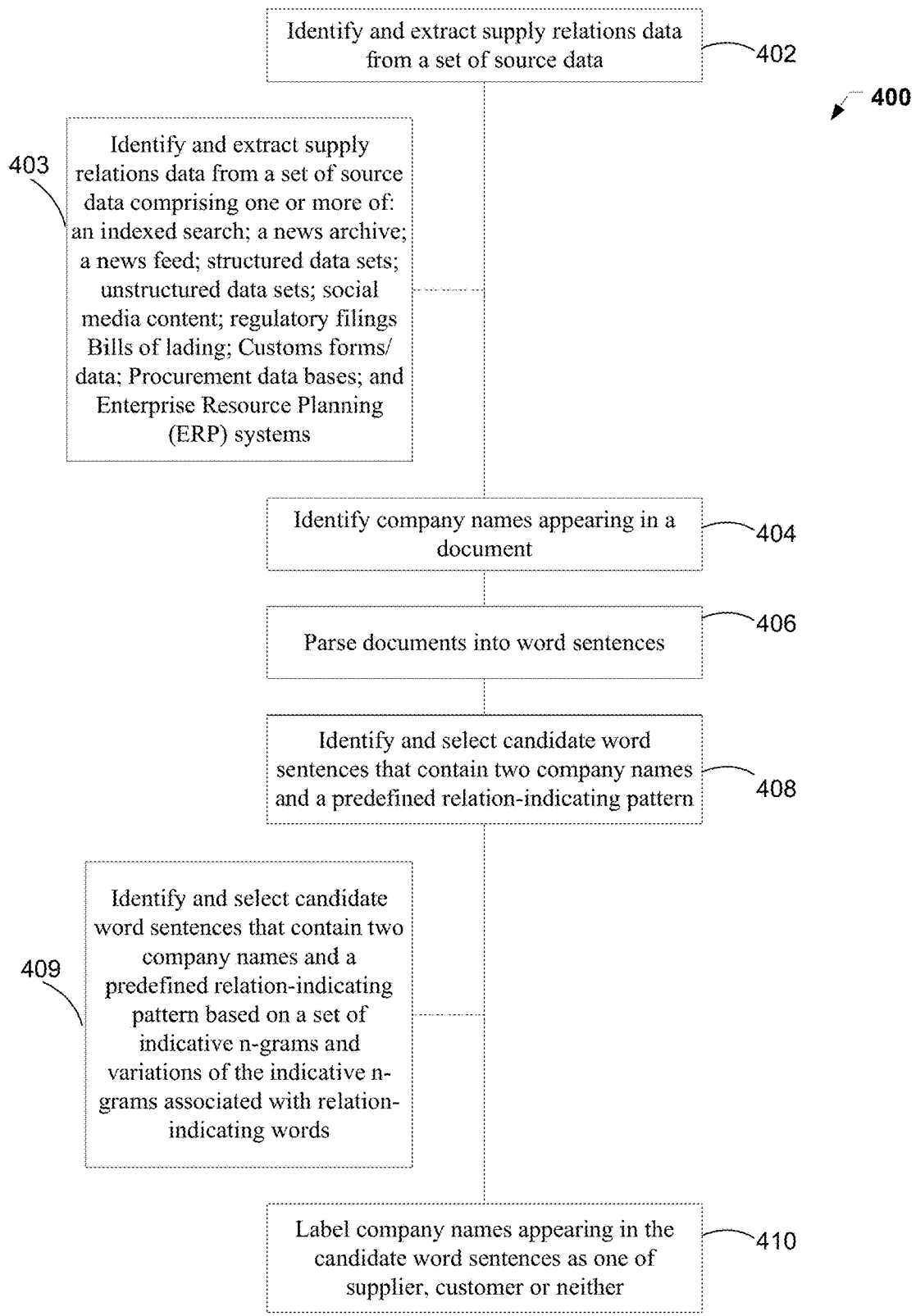
FIG. 4 is a flowchart representing additional processes for use in connection with the process of FIG. 3 in accordance with the present invention.

Now with reference to FIG. 4, the process 300 of FIG. 3 may be further configured as process 400 to perform one or more of the following steps. At step 402, the SRGD Store automatically identifies and extracts supply relations data from the set of source data and stores the extracted supply relations data in the graph database. At step 403, SRRSA with a machine learning module 126 automatically identifies and extracts supply relations data from a set of source data comprising one or more of: an indexed search; a news archive; a news feed; structured data sets; unstructured data sets; social media content; regulatory filings Bills of lading; Customs forms/data; Procurement data bases; and Enterprise Resource Planning (ERP) systems. The SRRM: identifies company names appearing in a document at step 404; parses documents into word sentences at step 406; identifies and selects candidate word sentences that contain two company names and a predefined relation-indicating pattern at step 408; and labels company names appearing in the candidate word sentences as one of supplier, customer or neither at step 410. In addition, the process 400 may optionally include identifying and selecting candidate word sentences that contain at least two company names and a predefined relation-indicating pattern based on a set of indicative n-grams and variations of the indicative n-grams associated with relation-indicating words.

The systems and processes of the present invention may optionally include a supply risk classifier, which comprises finding instances of company mentions and supply risk-type mentions. It is then determined whether the company mentioned is exposed to the supply risk mentioned. Specifically, the present invention comprises a supervised risk classifier that extracts company-risk relation mentions using a set of purpose-defined features defined over sentences of text. In one embodiment, the extraction may be performed by a Support Vector Machine (SVM). The relation classifier uses input from a company named entity tagger as well as input from a weakly-supervised supply risk-type taxonomy. The SVM may be trained over a set of training data, e.g., a set of hand-annotated news stories from an international news agency's news archive.

Figure 5:
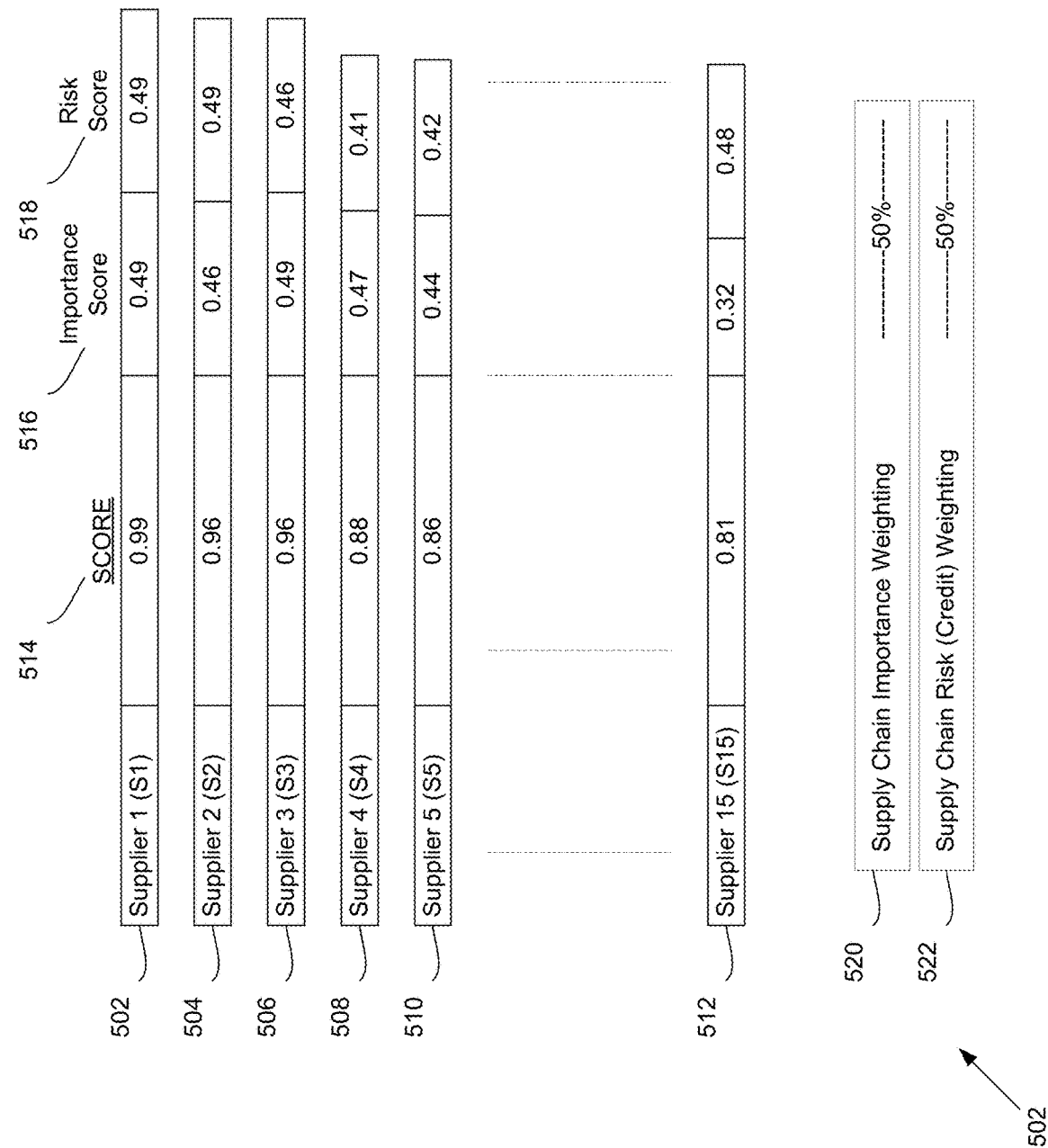
FIG. 5 is an exemplary user interface representing visualizations related to supply chain risk illustrating risk and importance scoring components in accordance with the present invention.
Figure 6:
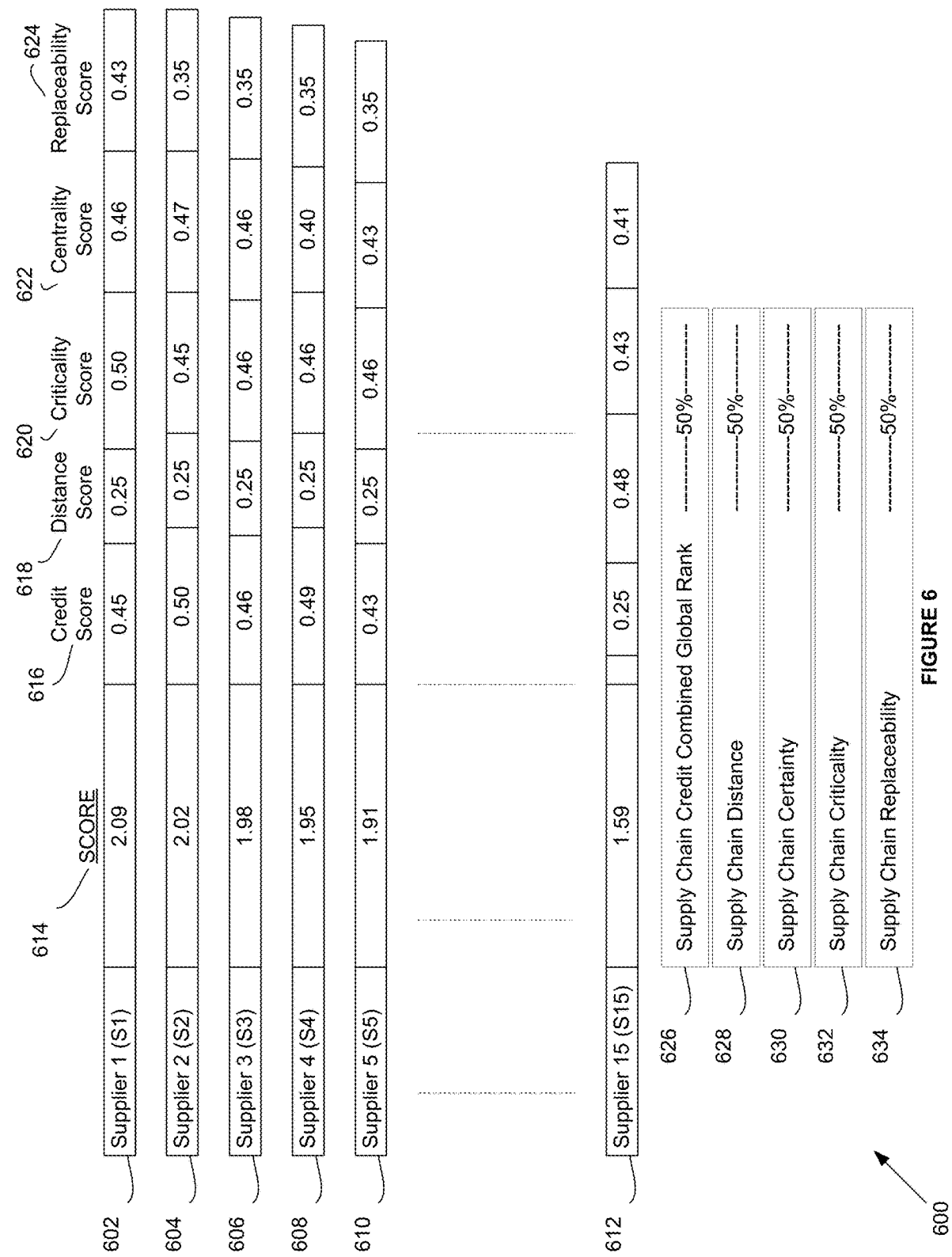
FIG. 6 is an exemplary user interface representing visualizations related to supply chain risk illustrating importance scoring components in accordance with the present invention.

Now with reference to FIGS. 5 and 6, importance and risk calculations, exposed through Application Programming Interfaces (APIs) as described above, may be queried and results visualized. In one exemplary embodiment, the user interface involves using an that provides an interface with functionalities to search for an entity, in this example companies, and retrieve and visualize the entity's (company's) peers. As discussed herein, one key focus is on presenting user interfaces to aid users in exploring supply chain risks along a chain of distribution on an individual company basis, a peer group basis, a market basis, and many other ways to help convey potential for risk in a set of supply relations.

FIG. 5 is an exemplary schematic of a user interface 500 showing an example of a visualization of importance and risk factors for a user. Once a user submits a query, the interface application requests data through the associated APIs and renders the returned json files. As shown in FIG. 5, interface 500 represents a set of scores for a set of suppliers 502-512 and having a total score 515 comnprised of an importance score 516 and a risk score 518, e.g., a credit risk score. FIG. 5 shows importance as a single slider 518 as an aggregated importance score. In this example, the user interface 500 provides elements 520 and 522 for respectively selecting a weighting of importance and risk. These elements may be ganged so as to decrease one in relation to an increase in the other factor.

With reference to FIG. 6, the user interface 600 returns the components of our importance score individually. In both cases the user can use the sliders to adjust the weighting of the individual scores, depending on individual preferences, with the second view allowing more granular weighting. Additionally, the user interface may offer options to use different weighting mechanisms and render more or fewer results. FIG. 6 illustrates an exemplary schematic of a user interface 600 showing an example of a visualization of importance risk factor components for a user. Once a user submits a query, the interface application requests data through the associated APIs and renders the returned json files. A user may navigate from the user interface 500 of FIG. 5 to user interface 600 to examine more closely the importance score 516 component. As shown in FIG. 6, interface 600 represents a set of scores for a set of suppliers 602-612 and each having an associated importance score 614 comprised of credit score 616, distance score 618, criticality score 620, centrality score 622, and relaceability score 624. The scores are arrived at as discussed above. In this example, the user interface 600 provides elements 626-634 for respectively selecting a weighting of importance risk factors 616-624. These elements may be ganged so as to decrease ones in relation to an increase in other factors. For example, a user may know or believe based on professional judgment that certain factors are more or less indicative of risk for a given company or industry or market and may selectively operate the user elements to arrive at a desired set of conditions on which to consider supply risk.

Figure 7:
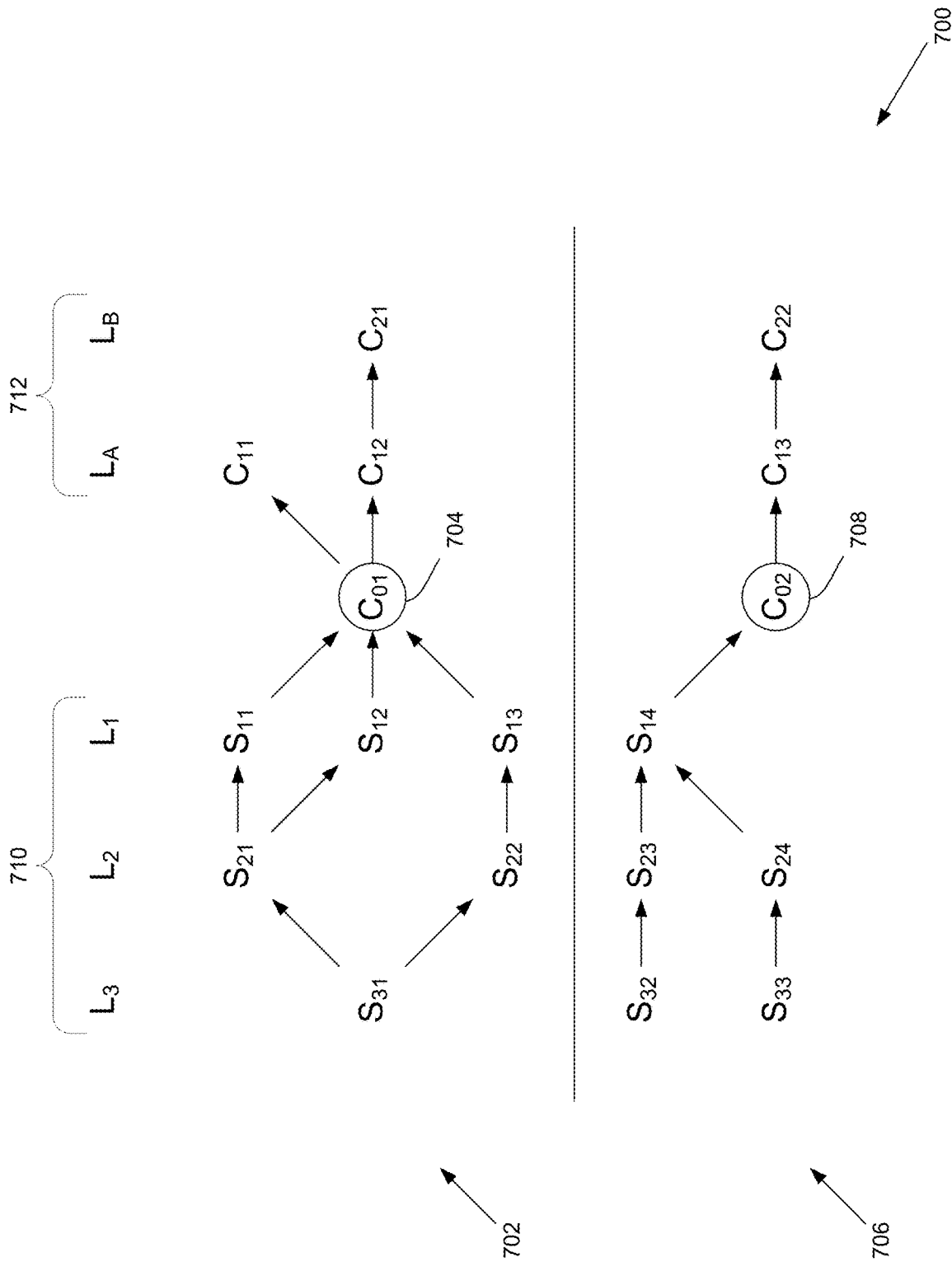
FIG. 7 is a schematic diagram illustrating a supply chain risk mapping in accordance with the present invention.

Now with reference to FIG. 7, an exemplary risk mapping 700 is provided comprised of supply risk mapping 702 for company $C_{01}$ 704 and supply risk mapping 706 for company $C_{02}$ 708. The mappings of FIG. 7 illustrate the propagation of risk from node-to-node as contemplated in accordance with the present invention. This mapping visualization and interface provides a user with one effective manner of conveying risk associated with a related set of suppliers as the risk propagates along tier groups.

For example, as shown in the supply risk mapping 702, company $C_{01}$ 704 has a set of suppliers along three tiers L1-L3 710. In this instance we limit the view to suppliers of a given key material or component necessary for each company C01/C02 to produce its products. Here suppliers S11-S13 of the key component are first-tier suppliers at the L1 level. Suppliers S21-S22 are second-tier suppliers at the L2 level and supply products to first-tier suppliers S12-S13 for use in making the key component for eventual delivery to company C01. For purposes of describing the invention we consider second-tier suppliers to include suppliers of key components to first-tier suppliers and may include the key component itself. Supplier S31 is a third-tier supplier at the L3 level and supplies one or more components to second-tier suppliers S21-S22.

Without knowledge of supplier data related to second-and third-tier suppliers to its first-tier suppliers S11-S13, Company C01 might operate under the belief that it is reasonably well insulated from risk associated with supply of a key component essential to manufacture of one of its products. This might lead to a false sense of supply resilience due to an erroneous belief of source redundancy, i.e., an illusion of redundancy. As shown in this example two (S11 and S12) of the three primary (first-tier) suppliers receive key components from second-tier supplier S21 and so there is no back-up third-tier supplier to second-tier suppliers S11 and S12. Accordingly, there is a heightened supply risk at the second and first-tier levels. If second-tier supplier S21 is unable to provide critical components to first-tier suppliers S11 and S12, then Company C01 is left with only one source for its key component—supplier S13. If S21 is unable to deliver, then Company C01 has no redundancy and no supply resilience and would face a critical supply risk. In real-time the SRRM system 100 can 1) detect the supply risk caused by this scenario and 2) upon detecting a severe threat to supplier S21 (e.g., bankruptcy, natural disaster, material shortage, etc.) elevate the supply risk score and profile associated with Company C01. This information may be conveyed in any of several forms to users/subscribers of financial and other professional services to alert interested parties in risk and possible change in forecasted or perceived valuation associated with Company C01 or an industry if the supply risk is widespread. By providing nested levels of input along multiple supply tiers, the present invention provides critical information to user of interest and effectively presents the critical information by user interfaces designed to convey supply risks along with user interface elements for professional users.

As shown in the supply risk mapping 706, company $C_{02}$ 708 has a set of suppliers along three tiers L1-L3. In this instance supplier S14 is a first-tier supplier at the L1 level, suppliers S23-S24 are second-tier suppliers at the L2 level, and suppliers S32-S33 are third-tier suppliers at the L3 level. In this mapping, Company C02 only has a single supplier S14 for a key component. Mitigating the effect of a single tier-one supplier is that supplier S14 obtains key components or materials from multiple second-tier suppliers S23 and S24 who both obtain components or materials from different third-tier suppliers S32 and S33 respectively.

In addition, company C01 provides products or components to its customers indicated as companies C11, C12, and C21 further up the chain of distribution at levels LA and LB 712 respectively. Company C02 provides products or components to its customers indicated as companies C13 and C22 further up the chain of distribution at levels LA and LB 712 respectively. The user interface 500 shows the chain of distribution upstream and downstream of companies C01 and C02. The user interface may be configured to allow a user to select a given entity along the chain of distribution to obtain more particularize supply risk information about the selected entity. In this manner a user can quickly and effectively navigate along and through a market or submarket of interest to probe weakness and value opportunities. Alerts may also be provided to alert users to a detected change (higher or lower supply risk score) of supply risk for a followed entity or market.

While importance has been discussed in terms of exemplary equations and ways to score this feature, the invention is not limited to the scoring described herein and is open to additional ways to evaluate and determine importance, risk and related scores, including alternative weighting algorithms. For example, one may extend the scope of risks to be measured and included to supplement the "informativeness" of the overall scoring. For particular sets of data and industries, a tailored set of criteria may be used to fine-tune or particularize the importance. In addition, instead of using credit risk/TRBC data for R risk scoring, alternative methods may be used and are fully contemplated by the invention. For example, we may include evidence from text-mining based risk analysis approaches as described in (Nugent, T., and Leidner, J. L. Risk mining: Company-risk identification from unstructured sources. In *IEEE International Conference on Data Mining* (2016), ICDM, pp. 1308-1311).

In addition, an extension of our approach to languages other than English is contemplated and may vastly expand the solution's usefulness from a practical application point of view. Whether such an extension ought to be based on machine translation or purpose-built models for each language in scope remains to be seen. Finally, we believe that developing a mechanism by which we can either learn the weights of the individual importance scores or determine them through a grid search, rather than simply weighting them equally, may further enhance the quality of the importance scores assigned to companies.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-based system for identifying supply chain risks and generating supply chain graphs representing an interconnected network of entities, the system comprising: a computing device having a processor in electrical communication with a memory, the memory adapted to store data and instructions for executing by the processor; a graph database using graph structures for semantic queries and accessible by the computing device and having stored therein a first data set comprising supply relations data, a set of nodes, and a set of edges; wherein each node represents a company and comprises a set of attributes related to the company, the set of attributes including two or more of: business sector, credit risk score, risk score, company name, and closeness centrality score; wherein each edge represents a directed supply relationship pointing from a supplier to a customer and directly relates items stored in the graph database; wherein the supply relations data is at least in part derived from a set of source data in electronic form and representing textual content comprising potential relation and risk phrases and/or numeric data; a set of application programming interfaces (APIs), each API in the set of APIs adapted to execute an associated algorithm having a set of input parameters on the graph database and return a structured file of a type associated with the API, the structured file comprising a header and a set of block types adapted to store a set of results of the execution of the associated algorithm on the graph database; a risk scoring module adapted to access, via the set of APIs using at least one graph query language comprising a set of callable commands, the first data set data from the graph database as provided by the set of APIs in the structured file, generate a set of scores related to the first data set, and store the set of scores in the graph database, wherein the risk scoring module generates the set of scores using both direct and transitive risk propagation along a plurality of nodes; and a supply graph generator adapted to access the first data set and the set of scores stored in the graph database and generate for presentation at a remote user computing device a directed graph comprising a plurality of interconnected nodes and edges representing a network of supply chain related entities, wherein the closeness centrality score C for each node is determined by using the following equation:

$$C(x)=(N-1)/E y\ d(y,x)$$

wherein here a given node(x) represents company x and the closeness centrality score C(x) for company x represents a measure of node(x)'s centrality in a graph G as the sum of the length of the shortest paths between the node(x) and all other nodes in the graph, with N being the total node count and d(x,y) being the distance between nodes x and y.

2. The system of claim 1 wherein the supply graph generator is adapted to generate for presentation at a remote user computing device at least one of: 1) a cyclic graph; and 2) a directed acyclic graph (DAG).

3. The system of claim 1 wherein the graph database is adapted for use with one of Cypher Query Language or SPARQL query language.

4. The system of claim 1 wherein the graph database is a Resource Description Framework (RDF) database and supply relations data is stored in a RDF triple format and is used to populate the graph database.

5. The system of claim 1 further comprising a supply relations search and analytics engine adapted to automatically identify and extract supply relations data from the set of source data and to store the extracted supply relations data in the graph database, the extracted supply relations data comprising supplier/customer pairs, and wherein the supply relations search and analytics engine is adapted to automatically update the first data set on a continuing basis as additional supply relations data is extracted from additional source data.

6. The system of claim 1 wherein the graph database is from the group consisting of: neo4j, Gephi, AllegroGraph, ArangoDB, Blazegraph, Cayley, DGraph, DataStax, SAP Hana, Oracle Spatial and Graph, OpenLink Virtuoso, Sparksee, Graphbase, gStore, InfiniteGraph, JanusGraph, MarkLogicSqrrl Enterprise, Teradata Aster, TigerGraph, Resource Description Framework (RDF) database, and Microsoft SQL Server.

7. The system of claim 1 further comprising:
an entity-risk relation classifier adapted to identify and extract entity-risk relations from the set of source data, the entity-risk relation classifier comprising:
a risk tagger adapted to identify in the set of source data a set of risk candidates based on the set of risk types; and
an entity tagger adapted to identify mentions of entity names in the set of source data;
wherein the entity-risk relation classifier maps the identified set of risk types to the identified entity names.

8. The system of claim 1, wherein for a given customer c having an associated node$_c$ and having an identified set of suppliers s={s$_0$, . . . s$_n$} each having an associated node, the risk scoring module is further adapted to generate a set of risk scores R={r$_0$, . . . r$_n$} and a set of importance scores I={i$_0$, . . . i$_n$}.

9. The system of claim 8, wherein each risk score $r_m \in R$ is based on a single attribute of a node in the graph G, the single attribute representing a credit risk associated with supplier m.

10. The system of claim 8, wherein each importance score $i_m \in I$ is an aggregate of a plurality of measures including at least two of the following measures: criticality; replaceability; centrality; and distance;
wherein criticality is a function of a proportion of goods, materials, commodities or other things received in business sector q associated with target company c as supplied from suppliers s={s$_0$, . . . s$_n$} operating in identified business sector associated with such suppliers s;
wherein replaceability is a function of the sum of the number of suppliers s∈ S that operate in the same business sector as s$_m$;
wherein centrality is a closeness centrality score represents the importance i$_m$ of supplier s$_m$ as a function of the associated node's centrality in a graph G as the sum of the length of the shortest paths between the node(s$_m$) and all other nodes in the graph; and
wherein distance is a function of a distance between the node associated with each supplier s$_m$ and the node associated with company c.

11. The system of claim 10, wherein the importance score $i_m \in I$ for a given supplier s$_m$ is an aggregate of criticality (a), replaceability (b), centrality (c), and distance (d) measures associated with that supplier as represented in the following equation:

$$i_m = \left(\frac{a+b+c+d}{4}\right) / \max \in I.$$

12. The system of claim 1 further comprising a supply relations search and analytics engine adapted to automatically identify and extract supply relations data from the set of source data and to store the extracted supply relations data in the graph database, and wherein the supply relations search and analytics engine comprises a machine learning module and is further adapted to automatically identify and extract supply relations data based on the following model: a) identify company names appearing in a document; b) parse documents into word sentences; c) identify and select candidate word sentences that contain two company names and a predefined relation-indicating pattern; and d) label company names appearing in the candidate word sentences as one of supplier, customer or neither.

13. The system of claim 12, wherein the relation-indicating pattern is based on a set of indicative n-grams and variations of the indicative n-grams associated with relation-indicating words.

14. The system of claim 1 wherein the set of source data received comprises one or more of: an indexed search; a news archive; a news feed; structured data sets; unstructured data sets; social media content; regulatory filings Bills of lading; Customs forms/data; Procurement data bases; and Enterprise Resource Planning (ERP) systems.

15. A method for identifying supply chain risks and generating supply chain graphs representing an interconnected network of entities, the method comprising: storing data and executable instructions in a memory of a computing device having a processor in electrical communication with the memory for accessing and executing the stored data and instructions; storing in a graph database accessible by the computing device a set of graph structures and a first data set comprising supply relations data, a set of nodes, and a set of edges; receiving, by the computing device, a semantic query for execution; accessing and executing, by the computing device, the set of graph structures and processing the received semantic query using the set of graph structures; wherein each node represents a company and comprises a set of attributes related to the company, the set of attributes including two or more of: business sector, credit risk score, risk score, company name, and closeness centrality score; wherein each edge represents a directed supply relationship pointing from a supplier to a customer and directly relates items stored in the graph database; wherein the supply relations data is at least in part derived from a set of source data in electronic form and representing textual content comprising potential relation and risk phrases and/or numeric data; executing a set of application programming interfaces (APIs), each API in the set of APIs having an associated algorithm and set of input parameters on the graph database, and returning a structured file of a type associated with a given API, the structured file comprising a header and a set of block types adapted to store a set of results of the execution of the associated algorithm on the graph database; accessing, via the set of APIs using at least one graph query language comprising a set of callable commands, the first data set data from the graph database as provided by the set of APIs in the structured file, generating a set of scores related to the first data set, and storing the set of scores in the graph database, wherein the set of scores is generated using both direct and transitive risk propagation along a plurality of nodes; and accessing the first data set and the set of scores stored in the graph database and generating for presentation at a remote user computing device a directed graph comprising a plurality of interconnected nodes and edges representing a network of supply chain related entities; wherein the closeness centrality score C for each node is determined by using the following equation:

$$C(x) = (N-1)/E y\ d(y,x)$$

wherein here a given node(x) represents company x and the closeness centrality score C(x) for company x represents a measure of node(x)'s centrality in a graph G as the sum of the length of the shortest paths between the node(x) and all other nodes in the graph, with N being the total node count and d(x,y) being the distance between nodes x and y.

16. The method of claim 15 further comprising by a supply relations search and analytics engine automatically identifying and extracting supply relations data from the set of source data and storing the extracted supply relations data in the graph database, the extracted supply relations data comprising supplier/customer pairs, and wherein the supply relations search and analytics engine is adapted to automatically update the first data set on a continuing basis as additional supply relations data is extracted from additional source data.

17. The method of claim 15 further comprising:
by an entity-risk relation classifier executed on the computing device, identifying and extracting entity-risk relations from the set of source data, including identifying in the set of source data a set of risk candidates based on the set of risk types; and identifying mentions of entity names in the set of source data; and mapping the identified set of risk types to the identified entity names.

18. The method of claim 15, wherein for a given customer c having an associated $node_c$ and having an identified set of suppliers $s=\{s_0, \ldots s_n\}$ each having an associated node, the risk scoring module is further adapted to generate a set of risk scores $R=\{r_0, \ldots r_n\}$ and a set of importance scores $I=\{i_0, \ldots i_n\}$.

19. The method of claim 18, wherein each risk score $r_m \in R$ is based on a single attribute of a node in the graph G, the single attribute representing a credit risk associated with supplier m.

20. The method of claim 18, wherein each importance score $i_m \in I$ is an aggregate of a plurality of measures including at least two of the following measures: criticality; replaceability; centrality; and distance;
wherein criticality is a function of a proportion of goods, materials, commodities or other things received in business sector q associated with target company c as supplied from suppliers $s=\{s_0, \ldots s_n\}$ operating in identified business sector associated with such suppliers s;
wherein replaceability is a function of the sum of the number of suppliers $s \in S$ that operate in the same business sector as $s_m$;
wherein centrality is a closeness centrality score represents the importance $i_m$ of supplier $s_m$ as a function of the associated node's centrality in a graph G as the sum of the length of the shortest paths between the node($s_m$) and all other nodes in the graph; and
wherein distance is a function of a distance between the node associated with each supplier $s_m$ and the node associated with company c.

21. The method of claim 20, wherein the importance score $i_m \in I$ for a given supplier $s_m$ is an aggregate of criticality (a), replaceability (b), centrality (c), and distance (d) measures associated with that supplier as represented in the following equation:

$$i_m = \left(\frac{a+b+c+d}{4}\right) / \max \in I.$$

22. The method of claim 15 further comprising automatically identifying and extracting supply relations data from the set of source data and to store the extracted supply relations data in the graph database, and automatically identifying and extracting supply relations data based on the following model: a) identify company names appearing in a document; b) parse documents into word sentences; c) identify and select candidate word sentences that contain two company names and a predefined relation-indicating pattern; and d) label company names appearing in the candidate word sentences as one of supplier, customer or neither.

* * * * *